(12) United States Patent
Kasper

(10) Patent No.: US 10,412,929 B2
(45) Date of Patent: Sep. 17, 2019

(54) WALL MOUNTED PET FEEDING SYSTEM

(71) Applicant: Terry M. Kasper, Livonia, MI (US)

(72) Inventor: Terry M. Kasper, Livonia, MI (US)

( * ) Notice: Subject to any disclaimer, the term of this patent is extended or adjusted under 35 U.S.C. 154(b) by 0 days.

(21) Appl. No.: 15/412,461

(22) Filed: Jan. 23, 2017

(65) Prior Publication Data

US 2017/0208774 A1    Jul. 27, 2017

Related U.S. Application Data

(60) Provisional application No. 62/431,721, filed on Dec. 8, 2016, provisional application No. 62/281,803, filed on Jan. 22, 2016.

(51) Int. Cl.
*A01K 5/01* (2006.01)
*A01K 7/00* (2006.01)
(Continued)

(52) U.S. Cl.
CPC .......... *A01K 5/0135* (2013.01); *A01K 5/0114* (2013.01); *A01K 7/005* (2013.01);
(Continued)

(58) Field of Classification Search
CPC ...... A01K 5/0114; A01K 5/0135; A01K 5/01; A01K 7/005; A01K 5/0128; A01K 1/0356; A47B 95/008; A47B 5/00; A47B 13/16; A47G 7/044; F16M 13/02
USPC ............ 248/220.21, 224.51, 225.11, 225.21, 248/311.2; 119/61.57, 467; 312/245; 211/90.01, 70.6, 71.04; 108/40, 42, 48, 108/93, 143
See application file for complete search history.

(56) References Cited

U.S. PATENT DOCUMENTS

| | | | | |
|---|---|---|---|---|
| 1,855,314 A | * | 4/1932 | Schacht | A01K 5/01 119/51.5 |
| 1,869,901 A | * | 8/1932 | Le Fever | A01K 1/0356 119/477 |

(Continued)

FOREIGN PATENT DOCUMENTS

WO    WO-2004/105467 A2    12/2004

OTHER PUBLICATIONS

International Search Report, PCT/IB2017/050343, dated Apr. 27, 2017.

*Primary Examiner* — Jonathan Liu
*Assistant Examiner* — Taylor L Morris
(74) *Attorney, Agent, or Firm* — Fishman Stewart PLLC

(57) ABSTRACT

A system includes a wall mount adaptor that may be configured to be secured to a wall. The wall mount adaptor may have a top recessed portion disposed proximate the wall and a plurality of slots disposed on a side of the adaptor opposite the wall. A cover or back splash may include a mating adaptor having a protrusion that may extend along a wall facing side of the mating adaptor and be configured to be received by or engage with the top recess. The mating adaptor may also include a plurality of connectors or pins that extend from the wall facing side, each of the plurality of connectors or pins may be configured to be received by or engage with a respective slot. The back splash may include an opening that may be configured to receive at least a portion of a horizontal tray. The horizontal tray may be configured to connect to the back splash and may be secured to the wall mount adaptor.

18 Claims, 34 Drawing Sheets

(51) Int. Cl.
*A47B 13/16* (2006.01)
*A47B 5/00* (2006.01)
A47B 95/00 (2006.01)
F16M 13/02 (2006.01)
A01K 1/035 (2006.01)

(52) U.S. Cl.
CPC ............... *A47B 5/00* (2013.01); *A47B 13/16* (2013.01); *A01K 1/0356* (2013.01); *A01K 5/01* (2013.01); *A47B 95/008* (2013.01); *F16M 13/02* (2013.01)

(56) References Cited

U.S. PATENT DOCUMENTS

| | | | | |
|---|---|---|---|---|
| 1,879,332 | A | 9/1932 | Kulp | |
| 1,900,868 | A * | 3/1933 | Ritchie | A01K 1/0356 119/515 |
| 2,555,396 | A | 6/1951 | Cosner | |
| 2,845,896 | A * | 8/1958 | Copeland | A01K 5/0114 119/51.01 |
| 3,099,355 | A | 7/1963 | Kane | |
| 3,260,559 | A * | 7/1966 | Newman | A47K 5/02 248/301 |
| D209,754 | S | 1/1968 | Robert | |
| D209,755 | S | 1/1968 | Robert | |
| D213,377 | S | 2/1969 | Robert | |
| D213,378 | S | 2/1969 | Robert | |
| D216,989 | S | 3/1970 | Robert | |
| 3,630,385 | A * | 12/1971 | Searcy | A47F 5/08 211/70.6 |
| 3,669,035 | A * | 6/1972 | Grossman | A47B 96/067 108/152 |
| 3,698,594 | A | 10/1972 | Boehlert | |
| D229,073 | S | 11/1973 | Bricket | |
| 3,776,193 | A * | 12/1973 | Post, Sr. | A01K 5/0114 119/51.5 |
| 4,044,723 | A | 8/1977 | Fitzpatrick | |
| 4,065,195 | A | 12/1977 | Fahmie | |
| 4,205,629 | A | 6/1980 | Wix | |
| 4,261,294 | A | 4/1981 | Bescherer | |
| 4,329,003 | A * | 5/1982 | Manchester | A47B 95/008 108/152 |
| 4,498,654 | A * | 2/1985 | Cooper | A47K 10/10 248/251 |
| 4,532,891 | A | 8/1985 | Jones | |
| 4,587,930 | A * | 5/1986 | Trego | A01K 5/0135 119/61.57 |
| 4,699,089 | A | 10/1987 | Teschke | |
| 4,798,170 | A | 1/1989 | DePiazzy | |
| 4,843,977 | A * | 7/1989 | Bridges | A47B 96/061 108/152 |
| 4,919,498 | A * | 4/1990 | Turner | A47B 5/06 312/241 |
| 4,976,223 | A | 12/1990 | Pierce | |
| 4,986,332 | A * | 1/1991 | Lanuza | B44C 7/022 160/327 |
| 5,000,124 | A | 3/1991 | Bergen | |
| 5,054,431 | A | 10/1991 | Coviello | |
| 5,144,912 | A | 9/1992 | Hammett et al. | |
| 5,152,247 | A * | 10/1992 | Brown | A01K 1/035 119/464 |
| 5,226,625 | A * | 7/1993 | Hanna | A47K 5/12 248/222.13 |
| D357,557 | S | 4/1995 | Piper | |
| D358,233 | S | 5/1995 | Weaver | |
| 5,435,266 | A * | 7/1995 | Carson | A01K 1/0356 119/464 |
| 5,501,176 | A | 3/1996 | Tully | |
| D375,818 | S | 11/1996 | Fischer | |
| 5,718,493 | A * | 2/1998 | Nikolai | A47B 95/008 312/245 |
| 5,730,081 | A | 3/1998 | Tsengas | |
| 5,802,647 | A * | 9/1998 | Helmsderfer | A47D 5/003 108/38 |
| 5,855,184 | A | 1/1999 | Eichler et al. | |
| 5,870,969 | A * | 2/1999 | Boyce | A01K 5/01 119/51.5 |
| D421,160 | S | 2/2000 | Akopdjanov | |
| D424,758 | S | 5/2000 | Akopdjanov | |
| D424,759 | S | 5/2000 | Sipka | |
| 6,098,941 | A * | 8/2000 | Gates | A47B 96/061 248/224.51 |
| 6,131,521 | A * | 10/2000 | Nelson | A47B 77/022 108/27 |
| 6,161,486 | A * | 12/2000 | Boots | A47B 5/06 108/33 |
| 6,189,489 | B1 * | 2/2001 | Pearce | A01K 1/0356 119/454 |
| 6,199,510 | B1 | 3/2001 | Louden | |
| 6,209,487 | B1 | 4/2001 | Quinlan et al. | |
| 6,308,641 | B1 * | 10/2001 | Kingbury | A47B 5/04 108/42 |
| 6,382,578 | B2 | 5/2002 | Azevedo | |
| 6,394,001 | B1 * | 5/2002 | Giesey | B60N 3/002 108/44 |
| 6,409,137 | B1 * | 6/2002 | Tran | A47C 7/68 206/549 |
| 6,427,626 | B1 | 8/2002 | Quinlan et al. | |
| 6,516,948 | B1 * | 2/2003 | Caballero | B25H 3/02 206/373 |
| 6,526,911 | B2 | 3/2003 | Louden | |
| 6,705,249 | B2 | 3/2004 | Quinlan et al. | |
| 6,729,685 | B1 * | 5/2004 | Ebalobor | A47C 9/06 108/13 |
| D491,697 | S | 6/2004 | Tsengas | |
| D506,295 | S | 6/2005 | Hammer et al. | |
| 6,901,880 | B2 | 6/2005 | Hammer | |
| 6,945,194 | B2 | 9/2005 | Fritsch | |
| 7,077,372 | B2 | 7/2006 | Moran | |
| 7,124,709 | B1 | 10/2006 | Greer | |
| 7,261,264 | B2 | 8/2007 | Moran | |
| 7,284,500 | B2 | 10/2007 | Denny et al. | |
| 7,314,023 | B1 | 1/2008 | Denny et al. | |
| 7,341,019 | B1 * | 3/2008 | Tsengas | A01K 5/0114 119/61.5 |
| 7,395,765 | B1 * | 7/2008 | Dorfman | A47B 5/00 108/42 |
| 7,513,219 | B2 * | 4/2009 | Louden | A01K 1/0356 119/477 |
| 7,530,329 | B1 * | 5/2009 | Paris, Sr. | A01K 1/0356 119/61.57 |
| 7,614,363 | B2 | 11/2009 | Di Angelo et al. | |
| 7,665,417 | B1 * | 2/2010 | Harper | A01K 5/0114 119/51.01 |
| 7,748,538 | B2 | 7/2010 | Esrich | |
| D622,013 | S | 8/2010 | Aho | |
| 7,802,327 | B1 * | 9/2010 | Moceri | A63H 33/3038 4/619 |
| 7,837,165 | B2 * | 11/2010 | Stone | A47G 7/044 224/414 |
| 7,938,083 | B1 | 5/2011 | Huether et al. | |
| 7,963,231 | B2 * | 6/2011 | Osborne | A47B 5/006 108/40 |
| D657,920 | S | 4/2012 | Rivera, Sr. | |
| 8,146,534 | B1 | 4/2012 | Robertson | |
| 8,148,651 | B1 * | 4/2012 | Coppola | A01K 5/0114 119/174 |
| D662,265 | S | 6/2012 | Lee et al. | |
| 8,245,992 | B2 * | 8/2012 | Matsui | F16M 11/10 248/224.51 |
| 8,308,115 | B2 | 11/2012 | Goto | |
| 8,342,129 | B2 * | 1/2013 | Harper | A01K 5/0114 119/61.5 |
| D676,612 | S | 2/2013 | Wygle | |
| 8,381,661 | B2 * | 2/2013 | Hilde | A47B 43/00 108/42 |
| 8,443,736 | B2 * | 5/2013 | Martenson | A47G 9/00 108/152 |

(56) References Cited

U.S. PATENT DOCUMENTS

| | | | |
|---|---|---|---|
| 8,517,320 B1* | 8/2013 | Nicely | A47B 96/063 211/90.01 |
| D695,974 S | 12/2013 | Young | |
| 8,671,598 B2* | 3/2014 | Murphy | D06F 81/06 108/42 |
| 8,672,172 B2* | 3/2014 | Huntington | A61F 13/551 206/459.5 |
| 8,684,195 B1* | 4/2014 | Caruso | A47B 95/008 211/87.01 |
| 8,776,725 B1* | 7/2014 | Grijalva | A01K 5/0114 119/51.01 |
| 8,807,082 B1 | 8/2014 | Alfonso | |
| 8,833,305 B2 | 9/2014 | Macpherson | |
| 8,893,657 B1 | 11/2014 | Kazmierzak | |
| 9,284,776 B2* | 3/2016 | Bond | A47B 13/00 |
| 2003/0106498 A1 | 6/2003 | Mersits et al. | |
| 2003/0192480 A1* | 10/2003 | Bennett | A01K 5/0114 119/61.5 |
| 2004/0112258 A1* | 6/2004 | Fichman | A47B 5/04 108/38 |
| 2005/0072894 A1* | 4/2005 | Grant | A47B 95/008 248/475.1 |
| 2005/0115508 A1 | 6/2005 | Little | |
| 2005/0246989 A1* | 11/2005 | Pringle | E04F 13/0862 52/384 |
| 2005/0279898 A1* | 12/2005 | Sweere | F16M 13/02 248/221.12 |
| 2006/0011142 A1 | 1/2006 | Walter | |
| 2006/0042549 A1 | 3/2006 | Bauman | |
| 2006/0196436 A1 | 9/2006 | Nichols | |
| 2007/0028854 A1* | 2/2007 | Chern | A01K 5/0114 119/753 |
| 2008/0023479 A1 | 1/2008 | Sadriwalla | |
| 2008/0179265 A1* | 7/2008 | Lin | B25H 3/04 211/70.6 |
| 2008/0190372 A1* | 8/2008 | Horvath | A01K 5/0135 119/61.56 |
| 2008/0237434 A1* | 10/2008 | Lin | F16B 43/00 248/497 |
| 2009/0001231 A1 | 1/2009 | Casanova | |
| 2010/0107984 A1 | 5/2010 | Uffner et al. | |
| 2010/0162961 A1 | 7/2010 | Hove et al. | |
| 2011/0049065 A1* | 3/2011 | Katz | A47F 5/08 211/35 |
| 2011/0114025 A1 | 5/2011 | McMurphy | |
| 2012/0325158 A1 | 12/2012 | Holman | |
| 2013/0334377 A1 | 12/2013 | Lee | |
| 2014/0346293 A1 | 11/2014 | Qiu | |
| 2015/0122185 A1 | 5/2015 | Lucky | |
| 2019/0053623 A1* | 2/2019 | Sisto | A47B 96/06 |

* cited by examiner

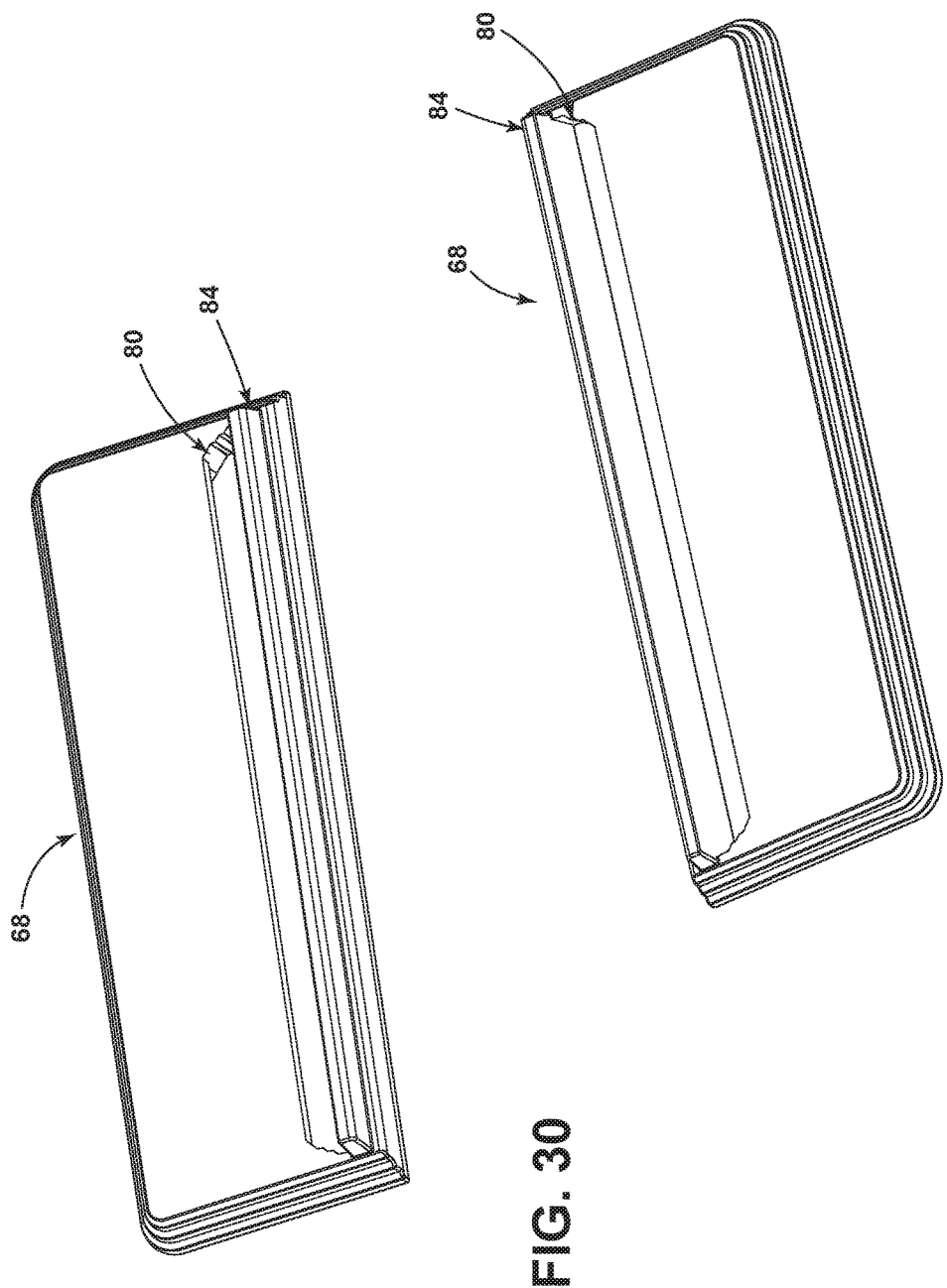

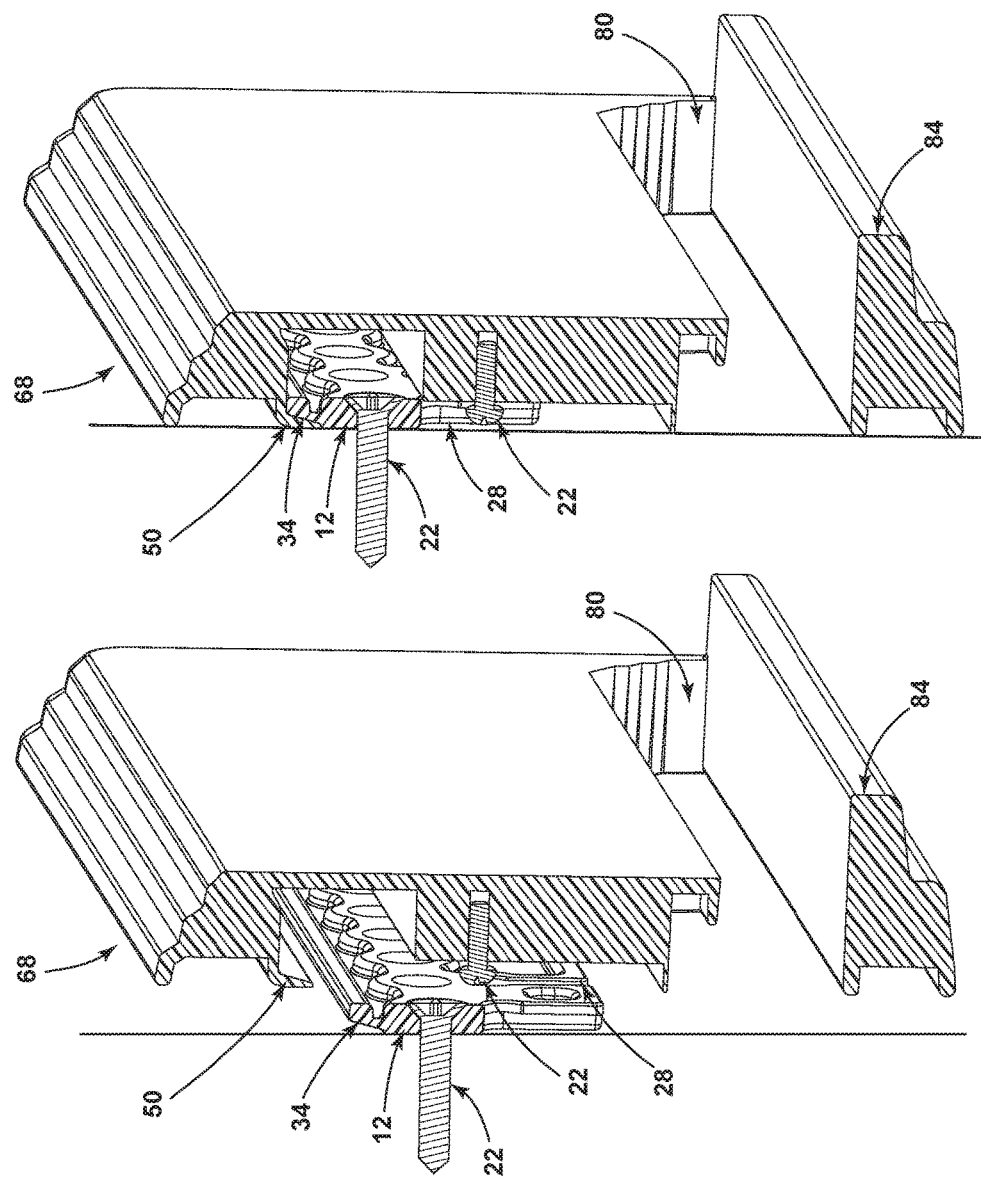

WALL MOUNTED PET FEEDING SYSTEM

CROSS REFERENCE TO RELATED APPLICATIONS

This application is based on and claims priority to U.S. Provisional Application 62/431,721 filed on Dec. 8, 2016 and U.S. Provisional Application 62/281,803 filed on Jan. 22, 2016, both of which are hereby incorporated by reference in their entirety.

TECHNICAL FIELD

The present disclosure relates to a system and method for mounting an adaptor to a wall, including a system and method for mounting a connectable tray to the adaptor.

BACKGROUND

Various systems for mounting trays or other objects to walls generally rely on securing mechanisms, such as screws or nails, in order to secure the tray or other objects to the wall. In general, wall mounting systems may include various mounting components that require various tools for assembling the components and attaching them to the wall. Additionally, various tools may be required to remove the wall mount components from the wall in order to, for example, clean the components. Accordingly, a system and method for assembling and attaching a wall mounted tray to a wall and disassembling the tray from the wall mount without the use of tools may be desirable. Additionally, a pet feeding system that allows an animal to consume food stored in a receptacle in the tray and prevents the pet from dislodging the receptacle may also be desirable.

SUMMARY

A system for mounting a tray to a wall may include a wall mount adaptor that may be configured to be secured to a surface such as a wall. The adaptor may have a top recessed portion disposed proximate the wall and a plurality of slots disposed on a side of the adaptor opposite the wall. A mating adaptor may include a protrusion that may extend along a wall facing side of the mating adaptor. The protrusion may be configured to be received by or engage with the top recess of the wall mount adaptor. The mating adaptor may also include a plurality of connectors or pins that may extend from the wall facing side of the mating adaptor. Each of the plurality of connectors or pins may be configured to be received by or engage with a respective one of the plurality of slots. A cover or back splash having an opening may be configured to receive at least a portion of a horizontal tray. The horizontal tray may be configured to connect to the cover or back splash and may be secured to the wall mount adaptor. The mating adaptor may be separate from or integral to the cover or back splash.

BRIEF DESCRIPTION OF THE DRAWINGS

FIG. 30 generally depicts a perspective view of an embodiment of a back splash embodying principles of the present disclosure;

FIG. 31 generally depicts another perspective view of an embodiment of a back splash embodying principles of the present disclosure;

FIG. 33 generally depicts a cross-section perspective view of an embodiment of a wall mount and back splash of the present disclosure, e.g., prior to being attached to a wall;

FIG. 34 generally depicts a cross-section perspective view of an embodiment of a wall mount and back splash of the present disclosure, e.g., after being attached to a wall;

DETAILED DESCRIPTION

Figure 1:
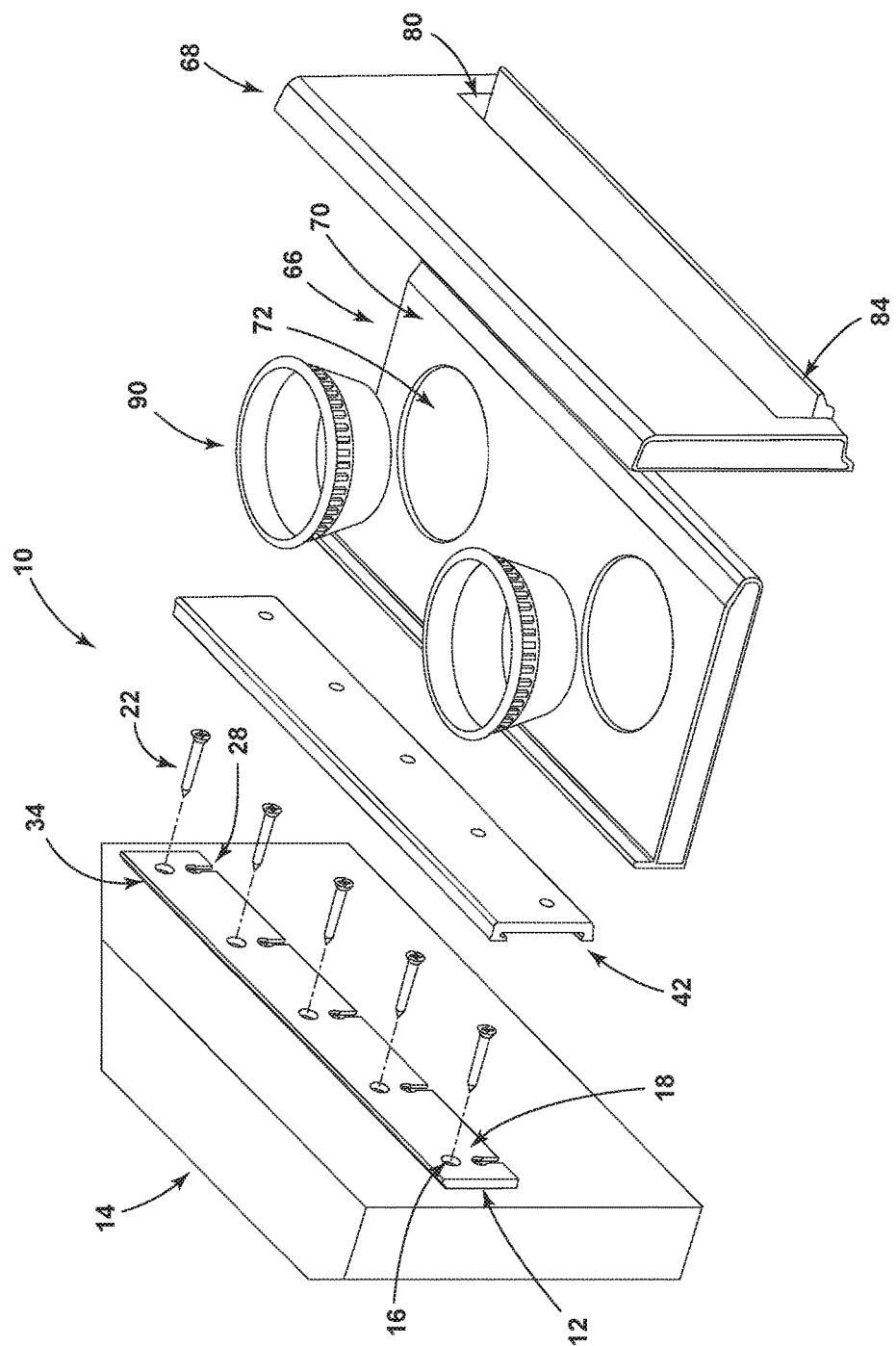
FIG. 1 generally depicts an exploded view of an embodiment of a wall mount locking system embodying principles of the present disclosure.
Figure 2:
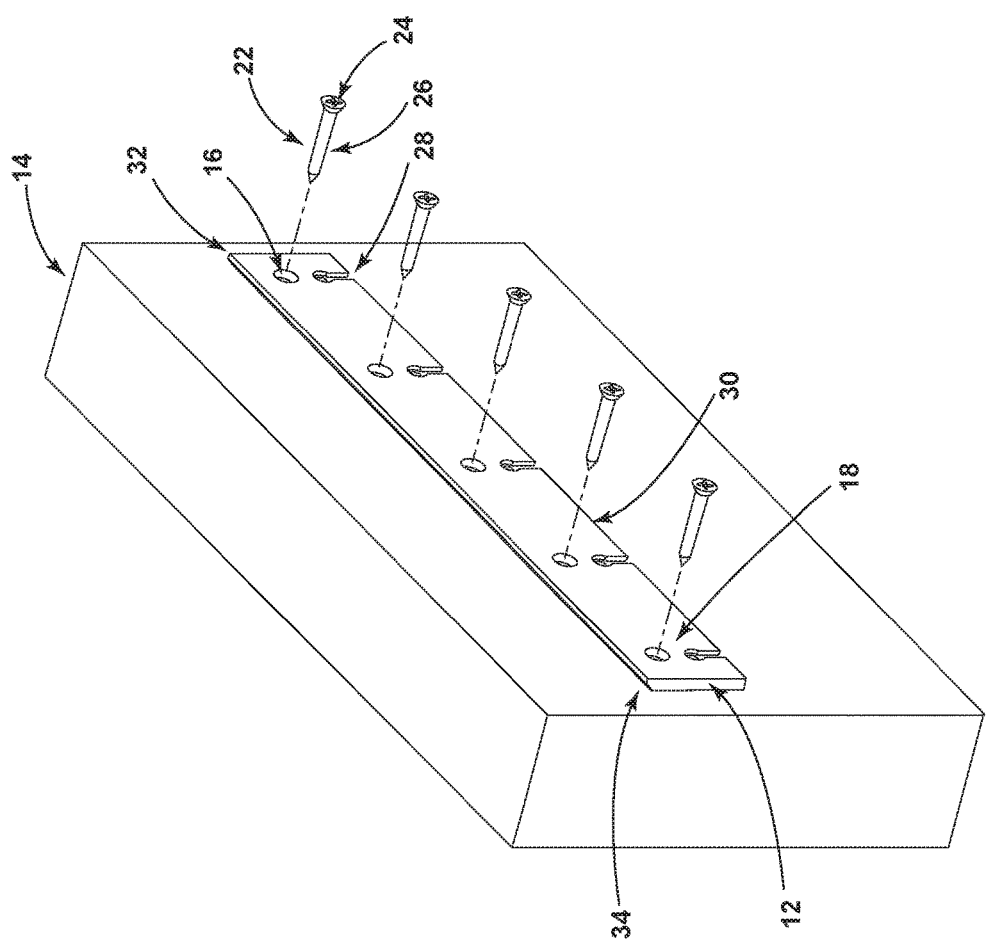
FIG. 2 generally depicts a perspective view of an embodiment of a wall mount adaptor embodying principles of the present disclosure.
Figure 3:
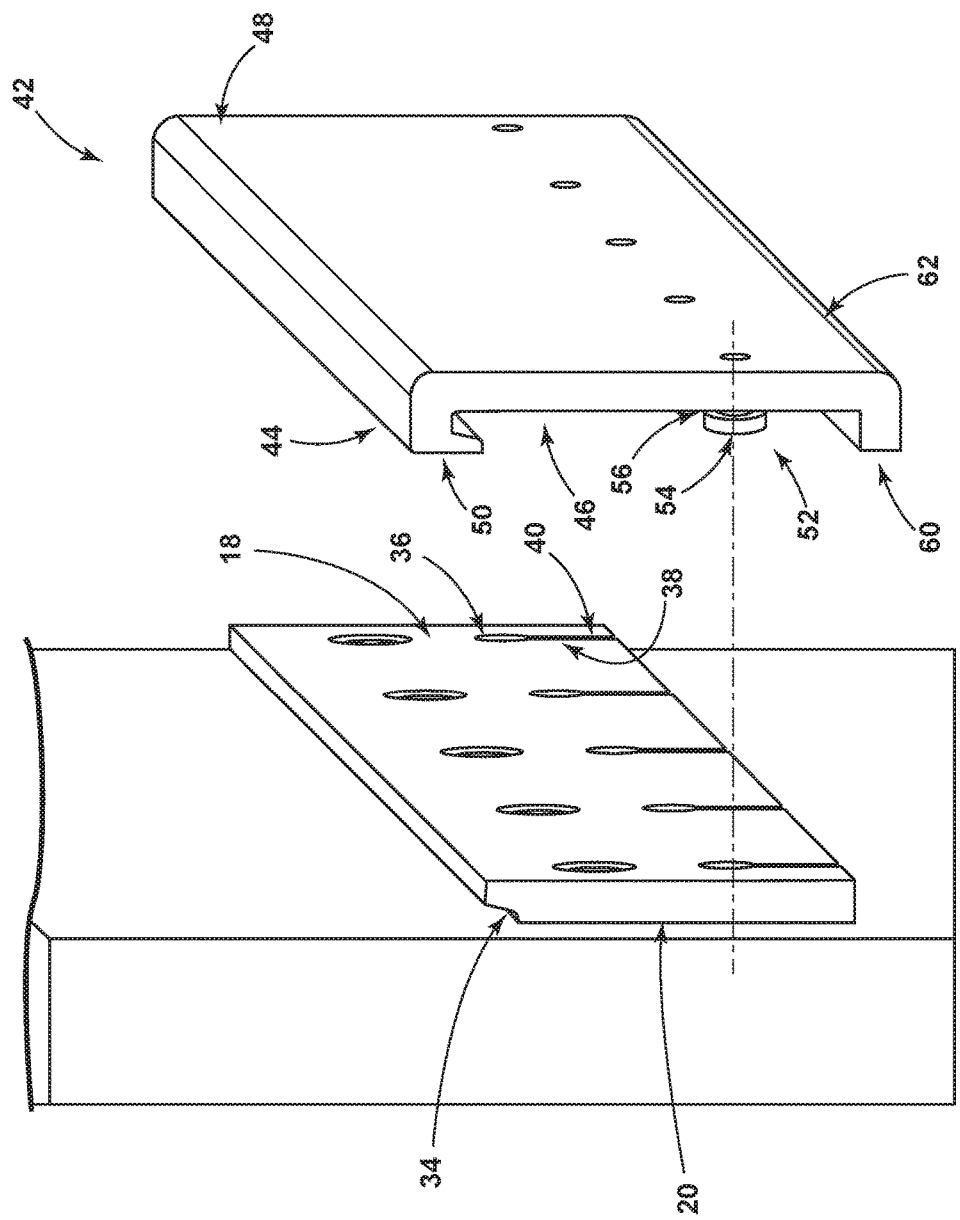
FIG. 3 generally depicts a perspective view of an embodiment of a wall mount adaptor and a mating adaptor embodying principles of the present disclosure.

With reference to FIGS. 1-3, an embodiment of a wall mount locking system 10 is generally illustrated. The system 10 may include a wall mount adaptor 12. The wall mount adaptor 12 may be configured to be secured to a surface, such as a wall 14. In embodiments, the wall mount adaptor 12 may include a plurality of apertures or holes 16 (referred to generally as "holes"). In embodiments, the plurality of holes 16 may comprise through bores that pass through a front side 18 of the wall mount adaptor 12 through a wall facing side 20 of the wall mount adaptor 12. The front side 18 may oppose the wall facing side 20.

Each of the plurality of holes 16 may be configured to receive a corresponding one of a plurality of fasteners 22. By way of non-limiting example only, the plurality of fasteners 22 may include screws, nails, or other suitable forms or types of wall fasteners. In embodiments, each of the plurality of fasteners 22 may include a head 24 and a shaft 26. The head 24 may be configured to receive a driver, such as, for example and without limitation, a screw driver. By way of non-limiting example and without limitation, the shaft 26 may comprise threads configured to resist withdrawal when a corresponding fastener 22 is driven into the wall 14. In embodiments, a shaft 26 of a corresponding one of the fasteners 22 may pass through a corresponding hole 16. The shaft 26 may be driven into the wall 14 by, for example and without limitation, a screw driver driving the corresponding head 24. Additionally, the corresponding head 24 may be comprised of a slightly larger diameter than a diameter of the corresponding hole 16. In this way, the head 24 may prevent the corresponding fastener 22 from passing through a corresponding hole 16. The fasteners 22 may secure the wall mouth adaptor 12 to the wall 14.

The wall mount adaptor 12 may include a plurality of recessed formations or slots 28. As generally illustrated in FIG. 2, each of the slots 28 may be disposed on the front side 18 of the wall mount adaptor 12. In embodiments, the slots 28 may comprise through bores passing through the front side 18 to the wall facing side 20. In other embodiments, the slots 28 may be recesses set into the front face 18 without passing through to the wall facing side 20. The slots 28 may be disposed on the front face 18 proximate a bottom side 30 of the wall mount adaptor 12 while the plurality of holes 16 may be disposed on the front face 18 proximate an upper portion 32 of the wall mount adaptor 12.

In other embodiments, the slots 28 may be disposed proximate the upper portion 32 while the holes 16 may be disposed proximate the bottom side 30. It is understood that the holes 16 and the slots 28 may be disposed in other suitable positions on the front face 28. In embodiments, the slots 28 may comprise a keyhole slot. For example, a receiving portion 36 may be disposed at or near a top portion 38 of the slots 28. Further, a tapered portion 40 may extend from the receiving portion 36.

In embodiments, the wall mount adaptor 12 may include a recess 34 disposed substantially near the upper portion 32. Further, the recess 34 may be disposed on or about the wall facing side 20. Accordingly, the recess 34 may be disposed proximate the wall 14. In embodiments, the recess 34 may provide a horizontal gap between the wall mount adaptor 12 and the wall 14 when the wall mount adaptor 12 is secured to the wall 14, such as generally illustrated in FIG. 3. As will be discussed in detail below, the horizontally extending recess 34 may be configured to receive a corresponding protrusion. In embodiments, the gap created by the recess 34 when the wall mount adaptor 12 is secured to the wall 14 may be configured to securely hold or lock the corresponding protrusion between the wall mount adaptor 12 and the wall 14.

The system 10 may include a mating adaptor (which may also be referred to as a "hook adaptor") 42. The mating adaptor 42 may be configured to be secured and/or locked into the wall mount adaptor 12. In embodiments, the adaptor 42 may be attached to the wall mount adaptor 12 without the use of tools. For example, the mating adaptor 42 may include a formation or protrusion 44. In embodiments, a horizontal protrusion 44 may be disposed proximate an engagement portion 48 of a hook adaptor 42. The engagement portion 48 may be disposed at or near an upper portion of the hook adaptor 42. The protrusion 44 may comprise a hook shaped protrusion that may extend away from a wall mount facing side 46 of the hook adaptor 42. The protrusion 44 may include an engagement portion 50 that may extend downward away from the engagement portion 48.

The protrusion 44 may extend horizontally along the hook adaptor 42 and be configured to engage and/or be received by the horizontal recess 34 of the wall mount adaptor 12. For example and without limitation, the protrusion 44 may be slid into the recess 34. The protrusion 44 may be configured to securely and/or snuggly fit into the recess 34.

The hook adaptor 42 may include a plurality of connectors or pins 52 (hereinafter referred to as "pins"). In embodiments, each of a plurality of pins 52 may comprise a pin head 54 and a pin shaft 56. In embodiments, the pin head 54 may comprise a diameter that is substantially similar to a diameter of the receiving portion 36. In embodiments, the each of the pin heads 54 may be inserted into corresponding receiving portions 36. For example, as described, the protrusion 44 may engage the recess 34. In embodiments, when the protrusion 44 engages the recess 34, the hook adaptor 12 may be slid or pushed downward toward the bottom side 30 of the wall mount adaptor 12. Each of the pin heads 54 may then be inserted into corresponding receiving portions 36 of the slots 28.

The hook adaptor 42 may then be slid or pushed further toward the bottom side 30. As described, the slots 28 may comprise a keyhole slot that may each include the tapered portion 40. The tapered portion 40 may be an opening narrower than a corresponding pin head 54. In embodiments, the tapered portions 40 may prevent corresponding pin heads 54 from withdrawing from the slots 28 when the hook adaptor 42 is slid onto the wall mount adaptor 12. Additionally, the slots 28 and the cooperation of the recess 34 with the horizontal protrusion 44 may substantially lock the hook adaptor 42 to the wall mount adaptor 12. The hook adaptor 42 may also include a lower protrusion 60 that may extend from the wall mount facing side 46 proximate to a lower portion 62. The lower protrusion 60 may engage at least a portion of the bottom side 30 of the wall mount adaptor 12. In embodiments, the lower protrusion 60 may guide the hook adaptor 42 as it is locked to the wall mount adaptor 12.

With reference to FIGS. 4-7, the system 10 may include a tray assembly as generally illustrated at 64. The tray assembly 64 may include a tray 66 and a cover or back splash 68 (referred to herein as "back splash"). As will be described in detail below, the tray assembly 64 may be configured to be secured to the hook adaptor 42. In embodiments, the tray assembly 64 may be configured to be secured to the hook adaptor 42 without the use of tools. The tray 66 may include a tray top 70. The tray top 70 may include a plurality of openings 72. However, it is understood that the tray top 70 may, if desired, comprise a flat surface without openings. The openings 72 may be round, square, or other suitable shapes. As will be described in detail below, the openings 72 may be configured to receive a receptacle, such as, by way of non-limiting example only, a bowl.

Figure 4:
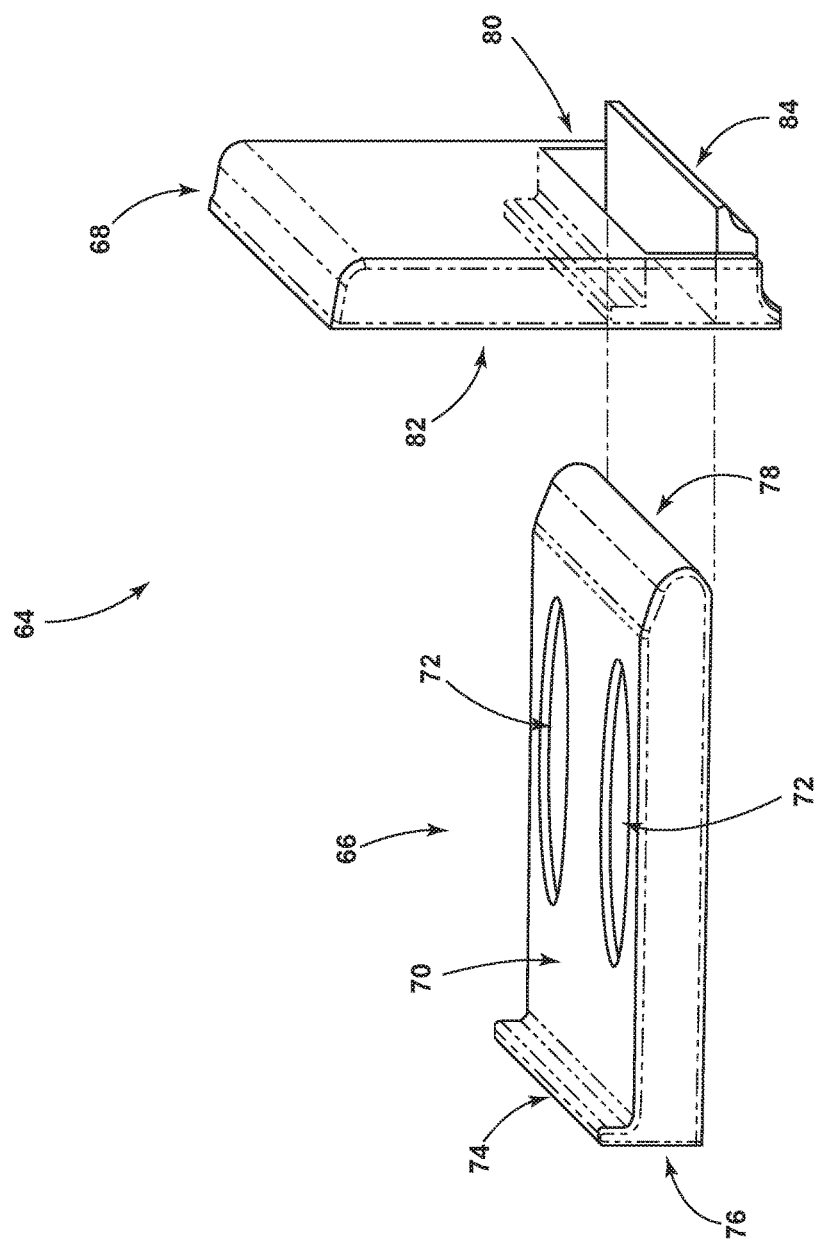
FIG. 4 generally depicts an embodiment of a tray and back splash assembly embodying principles of the present disclosure.
Figure 5:
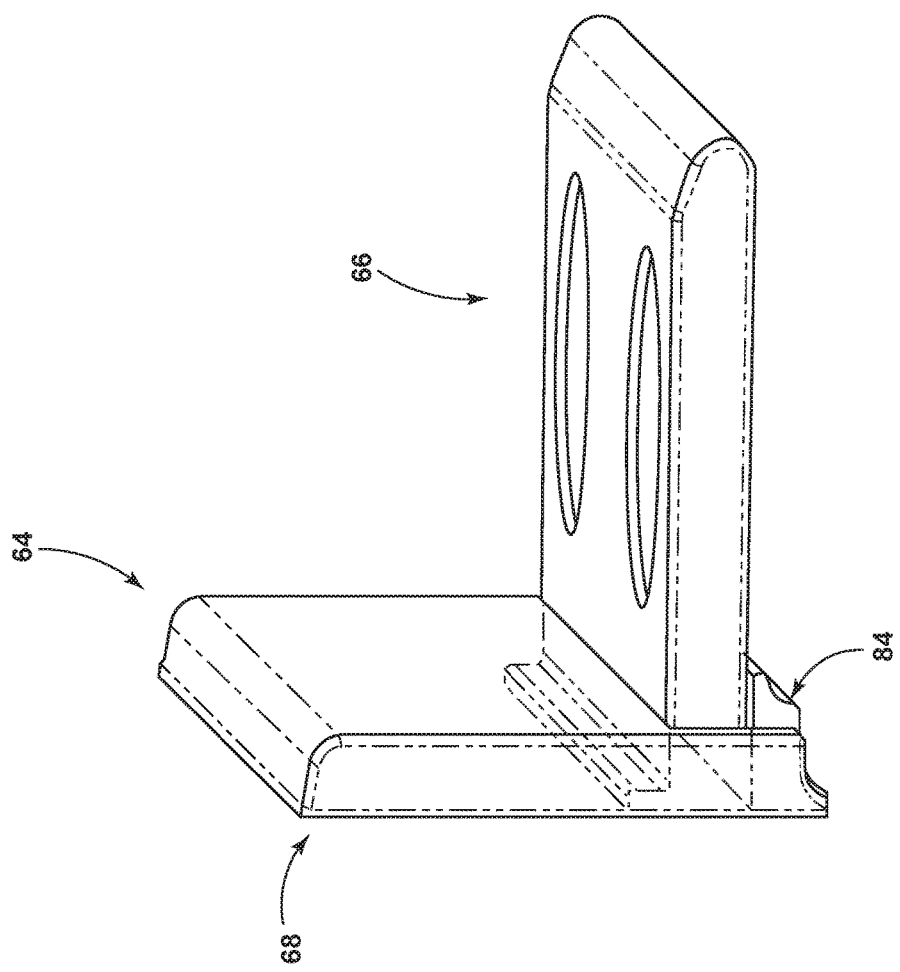
FIG. 5 generally depicts an embodiment of an assembled back splash and tray assembly embodying principles of the present disclosure.

The tray 66 may include a stop 74. In embodiments, the stop 74 may comprise a horizontally extending formation that extends from the tray top 70 proximate a rear portion 76 of the tray 66. The tray 66 may include a front portion 78. The front portion 78 may comprise a rounded edge, a flat edge, or other suitable contours. In embodiments, the front portion 78 may be configured to be received by a back splash slot 80. The back splash slot 80 may comprise a horizontal opening slightly larger than the tray 66. As generally illustrated in FIGS. 4 and 5, the tray 66 may be inserted into the back splash slot 80. The stop 74 may be configured to prevent the tray 66 from passing through the back splash slot 80. For example only, the stop 74 may engage a back portion 82 of the back splash 68.

In embodiments, the back splash 68 may include a tray support 84. The tray support 84 may extend from the back splash slot 80. In embodiments, at least a portion of a tray bottom 86 of the tray 66 may rest on a tray support 84 when the tray 66 is inserted into the back splash 68. The tray support 84 may, at least in part, support the tray 66 in a substantially original position when a force is applied to the tray top 70. By way of non-limiting example only, a person or animal may apply a force, for example, by pushing down on the tray top 70, to the tray 66. The tray support 84 may be resist the force and thereby prevent the tray 66 from being substantially displaced from an original position. It is understood the original position may be a position the tray 66 was in before a force was acted upon it.

Figure 6:
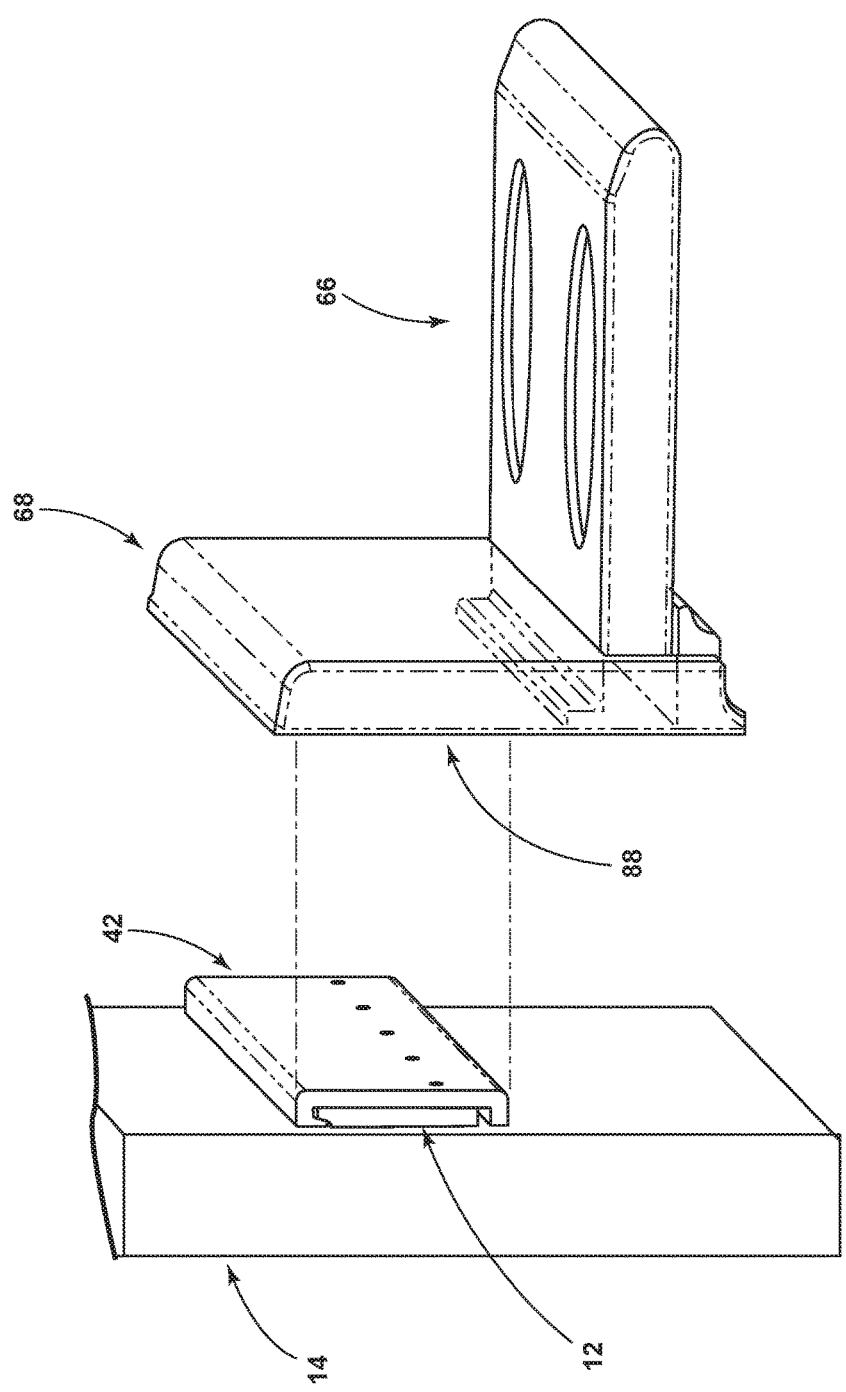
FIG. 6 generally depicts an embodiment of a wall mount and assembled back splash assembly embodying principles of the present disclosure.
Figure 7:
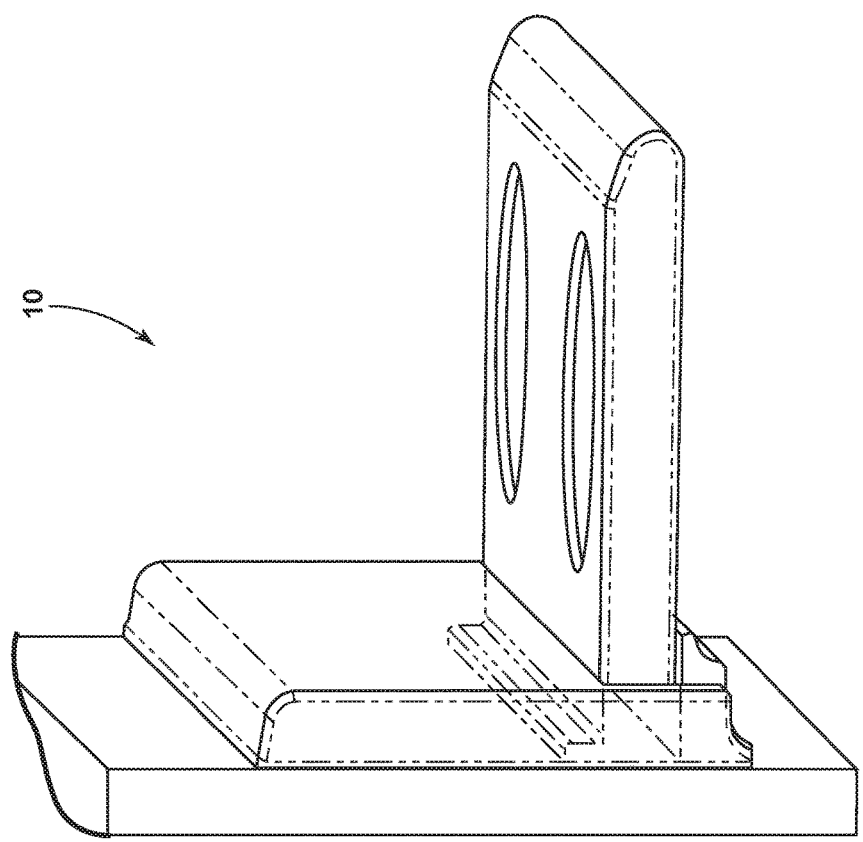
FIG. 7 generally depicts an embodiment of an assembled back splash assembly mounted to a wall embodying principles of the present disclosure FIG. 8 generally depicts an embodiment of an alternative wall mount locking system including a plurality of insertable receptacles.
Figure 8:
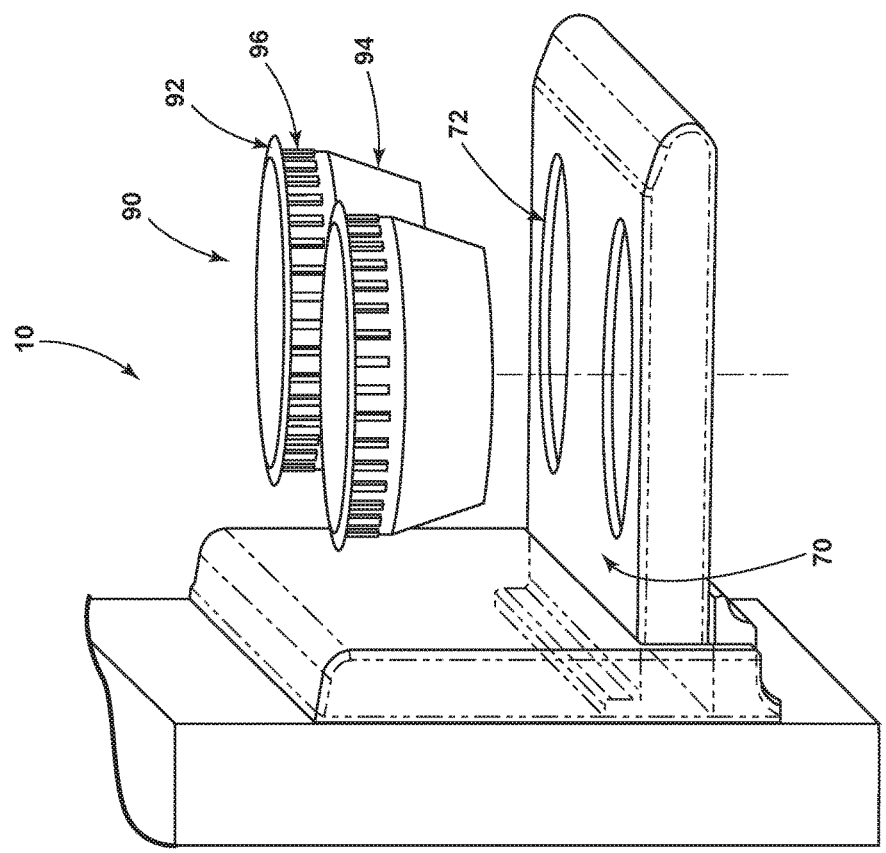
Figure 9:
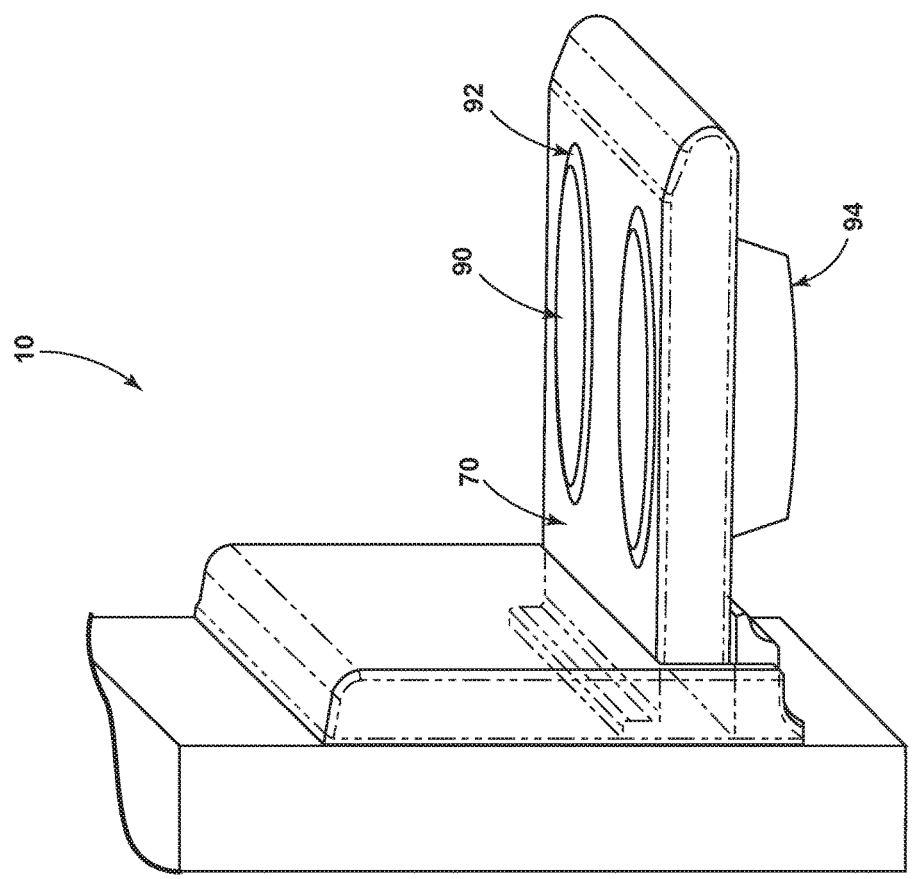
FIG. 9 generally depicts an embodiment of receptacles inserted into the alternative wall mount locking system generally illustrated in FIG. 8.
Figure 10:
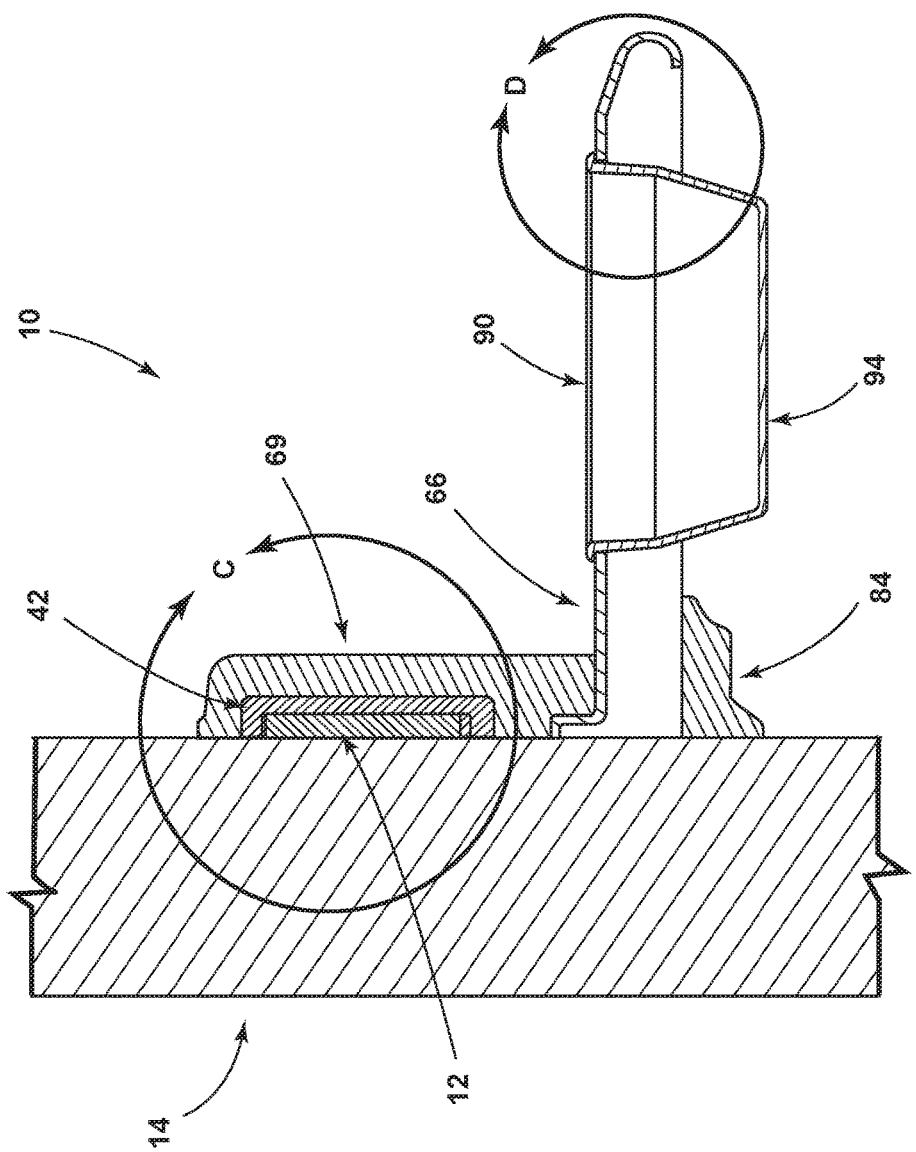
FIG. 10 generally depicts a cross-sectional view of an embodiment of a wall mount locking system embodying principles of the present disclosure.

FIG. 5 generally illustrates an assembled tray assembly 64. With particular reference to FIG. 6, the tray assembly 64 may be attached and/or coupled to the hook adaptor 42. The back splash 68 may include a recessed portion 88. The recessed portion 88 may be configured to receive the hook adaptor 42. For example only, the recessed portion 88 may be slightly larger than the hook adaptor 42, such that, for example only, when the back splash assembly 64 is pressed onto the hook adaptor 42, the recessed portion 88 engages the hook adaptor 42. By way of non-limiting example only, the tray assembly 64 and the hook adaptor 42 may be friction fit to each other. FIG. 7 generally illustrates an assembled wall mount locking system 10 comprising the tray assembly 64 attached to the hook adaptor 42. FIG. 10 generally illustrates a cross-sectional view of the wall mount locking system 10 assembled and attached to the wall 14.

With reference to FIGS. 8-14 a plurality of receptacles are generally illustrated at 90. In embodiments, the wall mount locking system 10 may include one or more receptacle 90. By way of non-limiting example only, the receptacle may be a bowl, pot, dish, sub-tray, or other suitable receptacle. Further, while the receptacles 90 are illustrated as comprising a generally round shape, the present disclosure contemplates receptacles comprising a generally square, rectangle, triangle, or other suitable shape.

Figure 11:
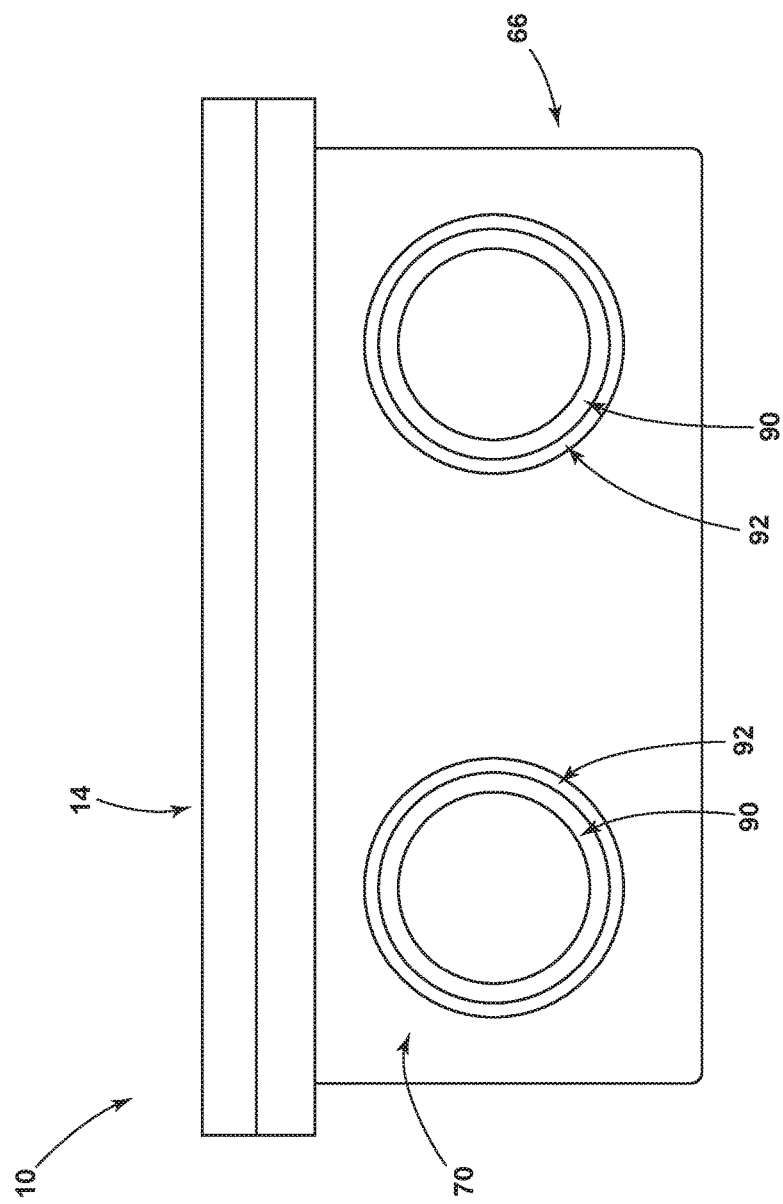
FIG. 11 generally depicts a top view of an embodiment of the wall mount locking system generally illustrated in FIG. 10.
Figure 12:
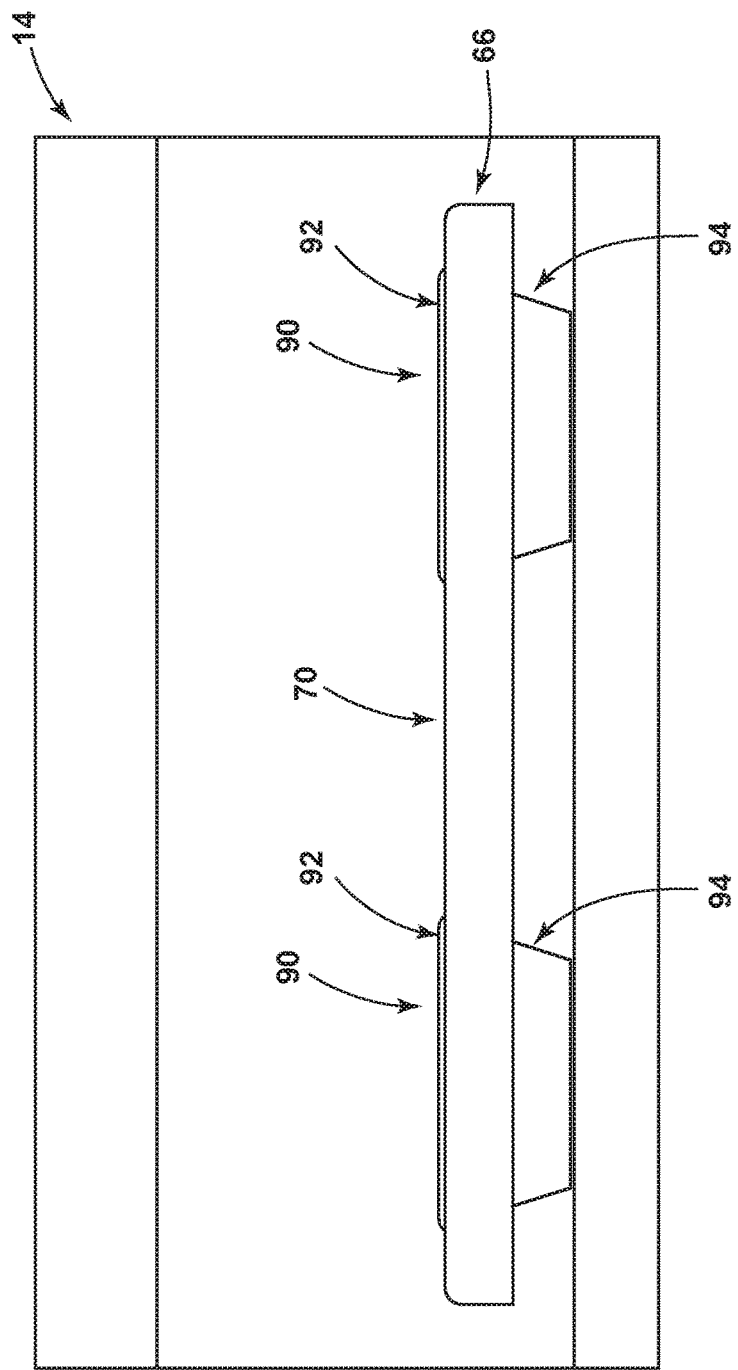
FIG. 12 generally depicts a front view of an embodiment of the wall mount locking system of FIG. 10.

The receptacles 90 may be configured to be received in the tray top 70. For example, the each of receptacles 90 may be configured to be inserted into a corresponding opening 72, as illustrated generally in FIG. 9. FIG. 11 generally illustrates a top view of the system 10 including the receptacles 90 inserted into the tray top 70. FIG. 12 generally illustrates a front view of the system 10 including the receptacles 90 inserted into the tray top 70.

Figure 13:
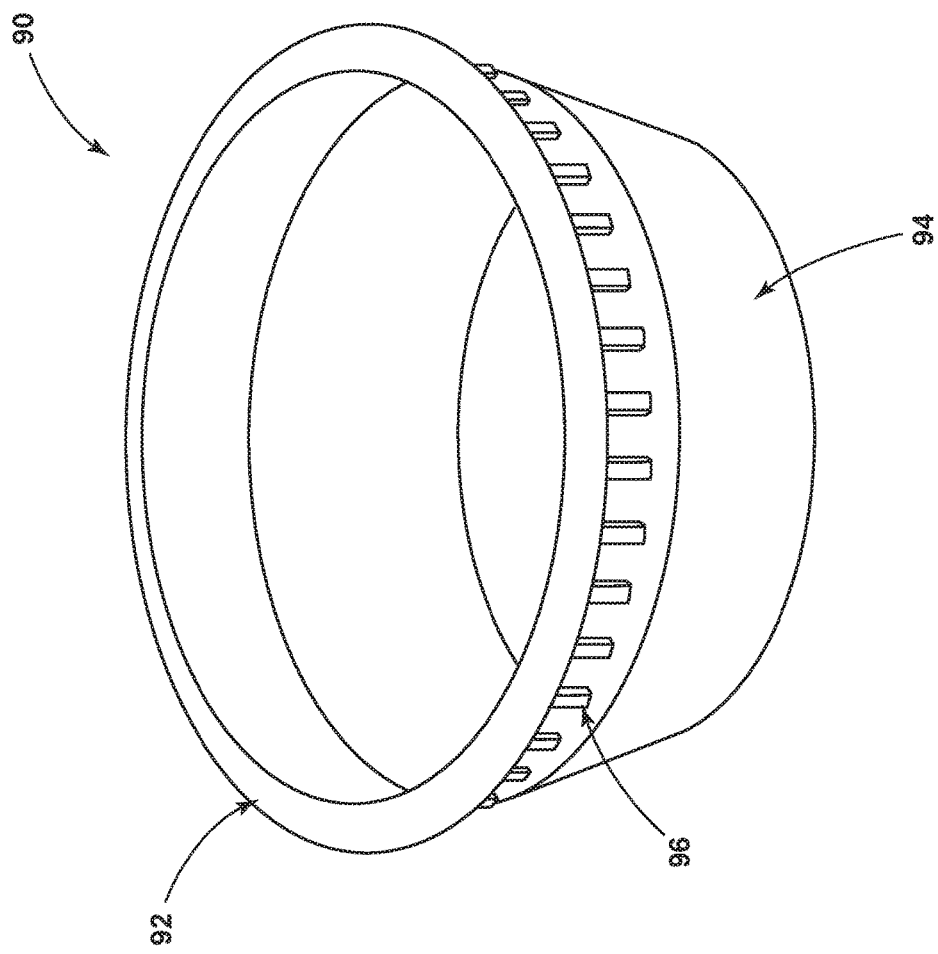
FIG. 13 generally depicts an embodiment of a tray receptacle embodying principles of the present disclosure.

In embodiments, and generally illustrated in FIG. 13, each of the receptacles 90 may include a lip 92. The lip 92 may comprise a diameter that is slightly larger than a diameter of a lower portion 94 of a corresponding receptacle 90. The lip 92 may be configured to prevent a corresponding receptacle 90 from passing through a corresponding opening 72. By way of non-limiting example only, the diameter of the lip 92 may be slightly larger than a diameter of a corresponding opening 72. In this way, the lower portion 94 may pass through the corresponding opening 72 while the lip 92 engages at least a portion of the tray top 70, which may prevent the receptacle 90 from passing through the tray 66.

Figure 14:
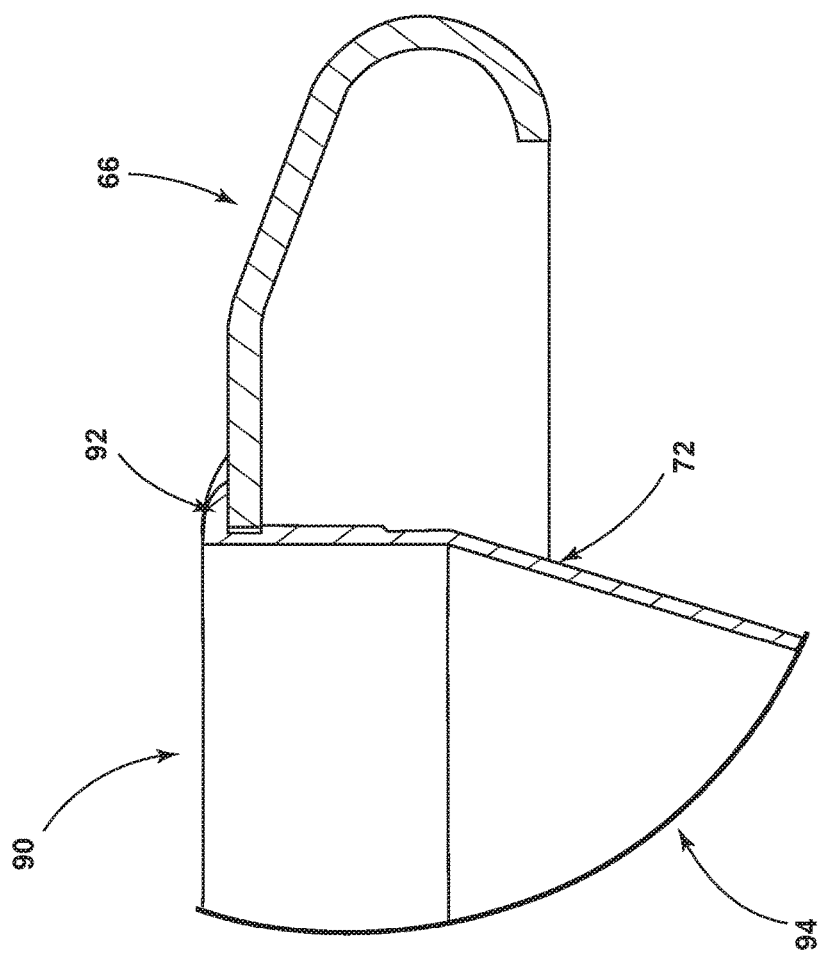
FIG. 14 generally depicts a cross-section of an embodiment of a receptacle generally illustrated in FIG. 13.

In embodiments, the receptacles 90 may include a plurality of ridges 96. The plurality of ridges 96 may be disposed proximate the lip 92 on the lower portion 94. Each of the plurality of ridges 96 may comprise a protrusion that extends away from a surface of the lower portion 94. By way of non-limiting example only, the ridges 96 may be configured to form a compress fit when a corresponding receptacle 90 is inserted into one of the openings 72. For example, each of the ridges 96 may engage an inner surface of the opening 72. Friction between each of the ridges 96 and the inner surface of the opening 72 may prevent a corresponding receptacle from being inadvertently dislodged from the opening 72. For example only, an animal, such as a dog or cat, may be substantially prevented from dislodging the receptacles 90. In other words, enough force to overcome the friction between the ridges 96 and the inner surface of the opening 72 may be required to dislodge the receptacle from the opening 72. FIG. 14 generally illustrates a cross-sectional view of a ridge 96 substantially compressed against the inner surface of a corresponding opening 72.

In embodiments, the lower portion 94 may be configured to retain water, pet food, soil, or other suitable objects or substances. By way of non-limiting example only, the wall mount locking system 10 may be configured as a pet feeder. For example, the wall mount locking system 10, as described, may be mounted to the wall 14. One or more receptacles 90 may be inserted into corresponding openings 72 in the tray top 70. Animal food, such as dog or cat food, for example only, may be placed in one of the receptacles 90. Additionally or alternatively, water may be placed in another of the receptacles 90. An animal, such as a dog or cat, for example, may approach the wall mount locking system 10. The animal may then consume food and/or water from the one or more receptacles 90. It is understood that while only a pet feeder is described, the wall mount locking system 10 may be configured as a wall shelf, a plant shelf, an animal feeder, or other suitable and/or desirable purpose.

Figure 15:
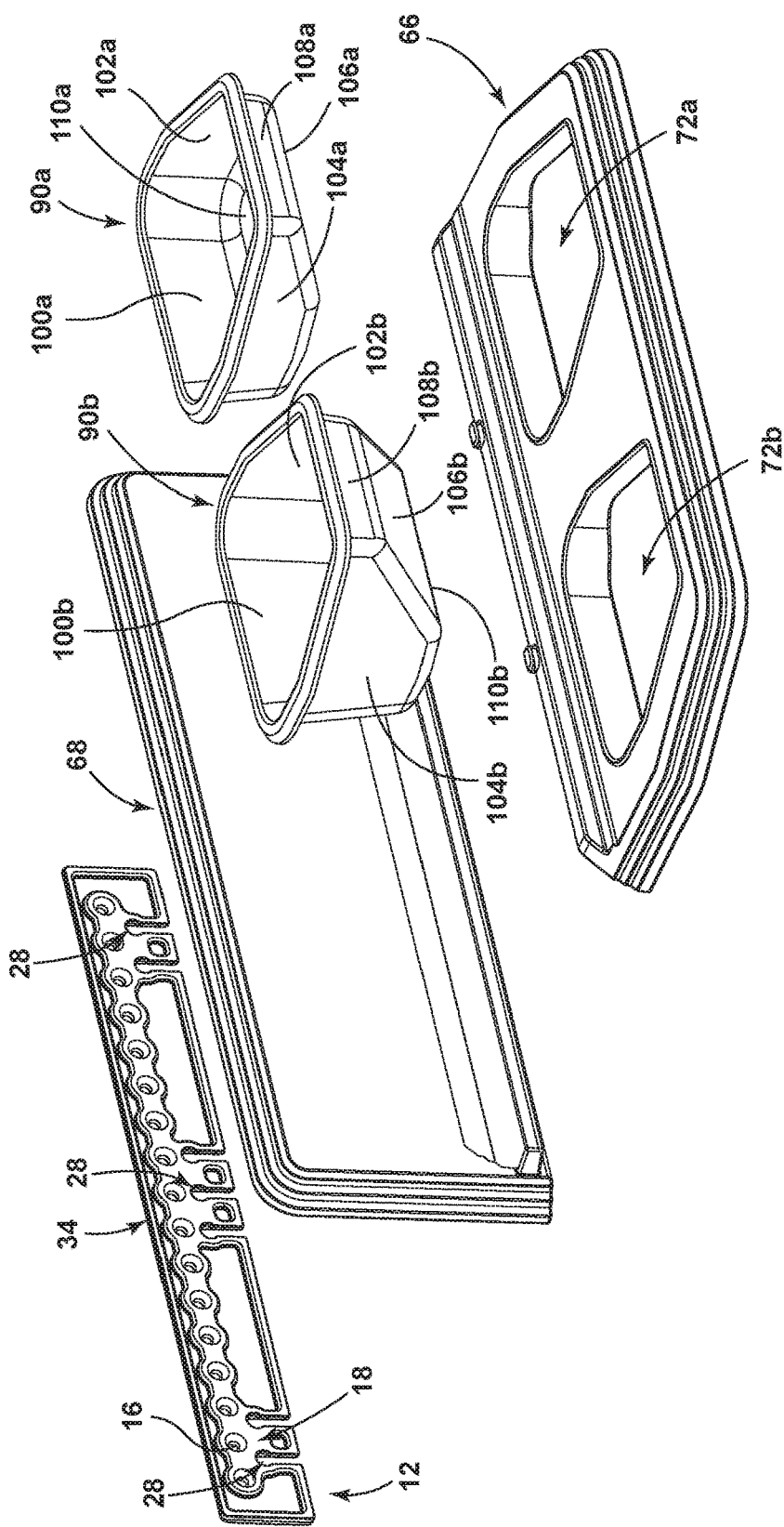
FIG. 15 generally depicts an exploded view of an embodiment of a wall mount locking system embodying principles of the present disclosure.
Figure 16:
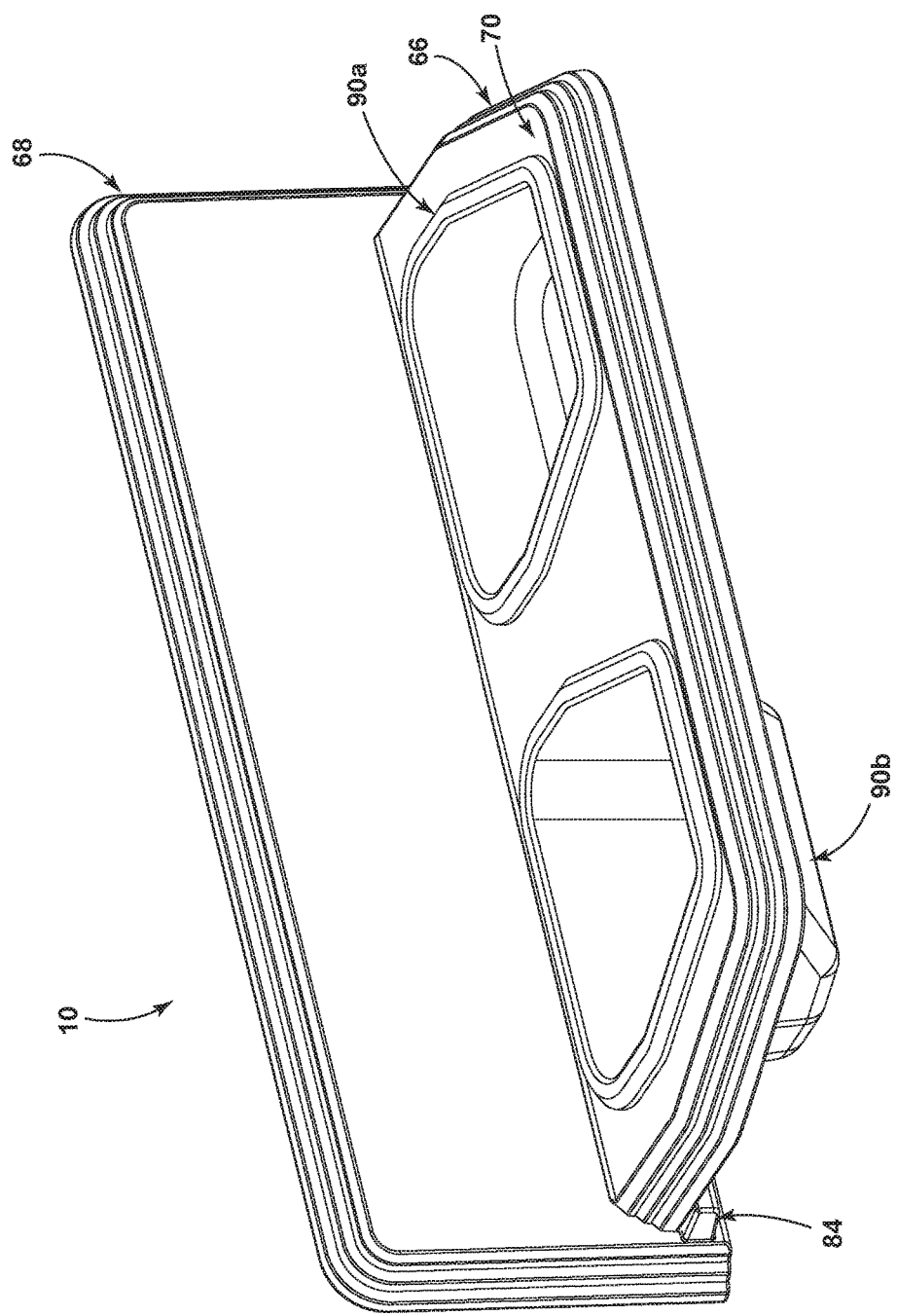
FIG. 16 generally depicts a front perspective view of an embodiment of a wall mount locking system embodying principles of the present disclosure.
Figure 17:
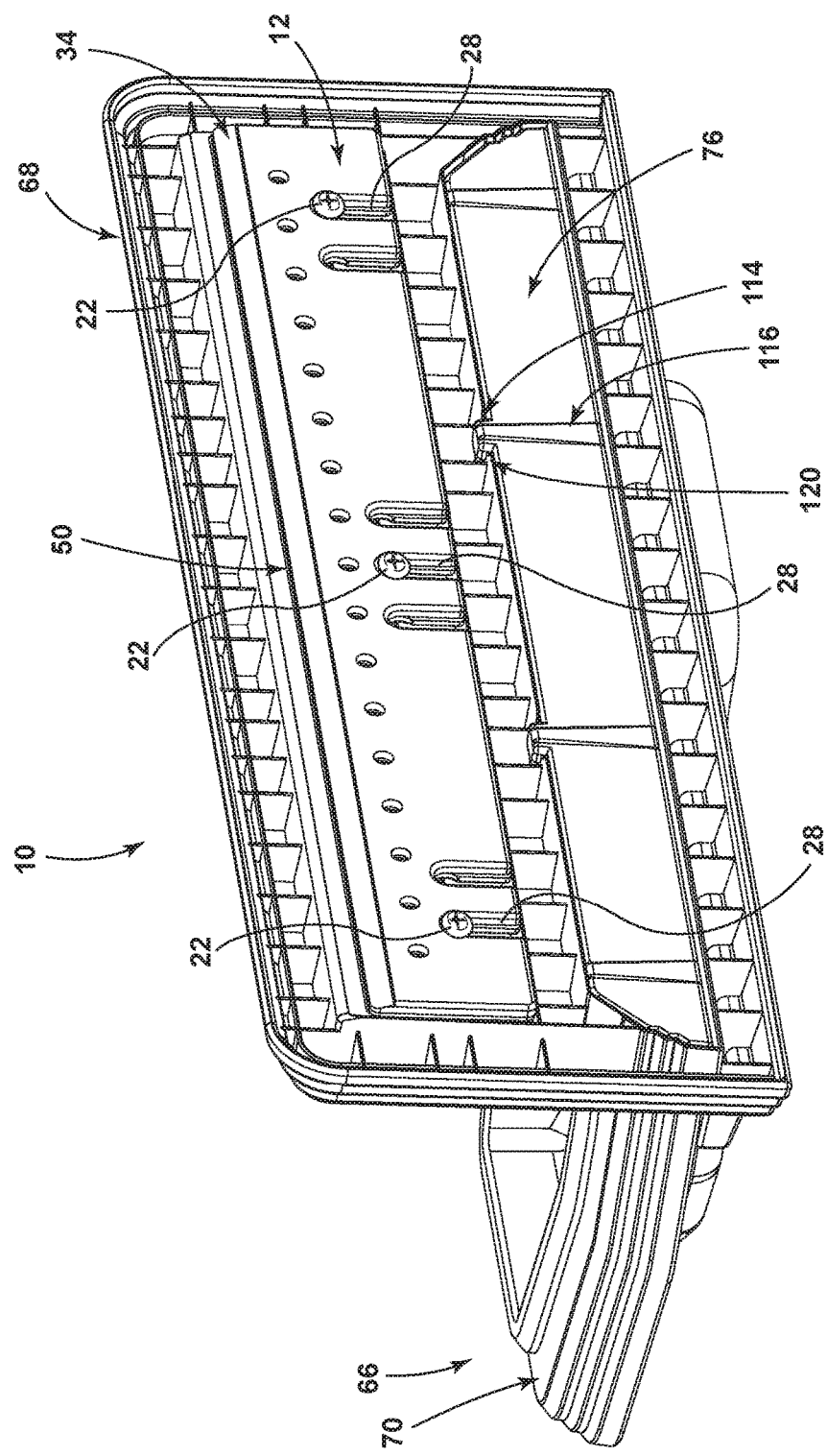
FIG. 17 generally depicts a back perspective view of an embodiment of a wall mount locking system embodying principles of the present disclosure.
Figure 18:
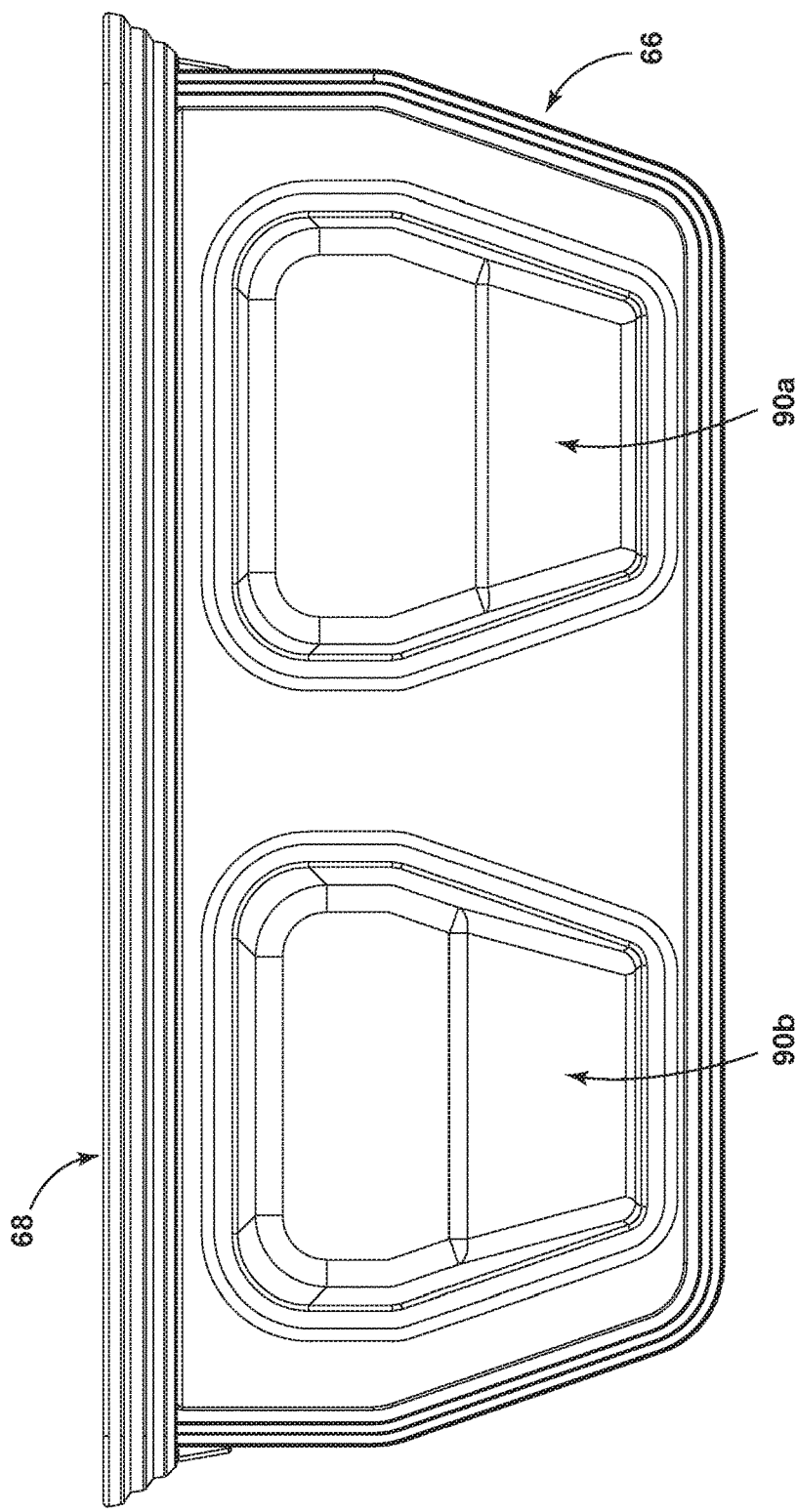
FIG. 18 generally depicts a top view of an embodiment of a wall mount locking system embodying principles of the present disclosure.
Figure 19:
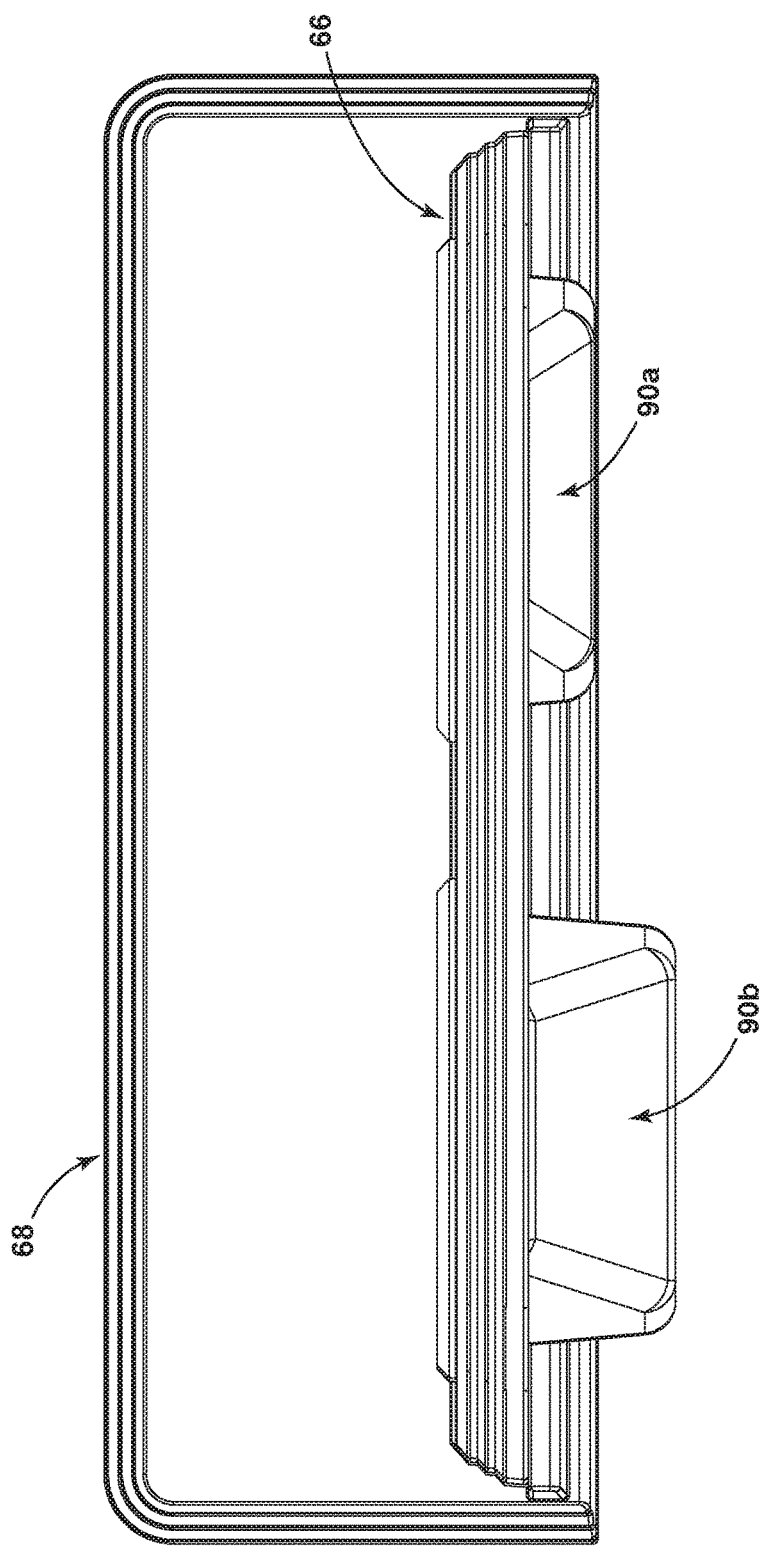
FIG. 19 generally depicts a front view of an embodiment of a wall mount locking system embodying principles of the present disclosure.
Figure 21:
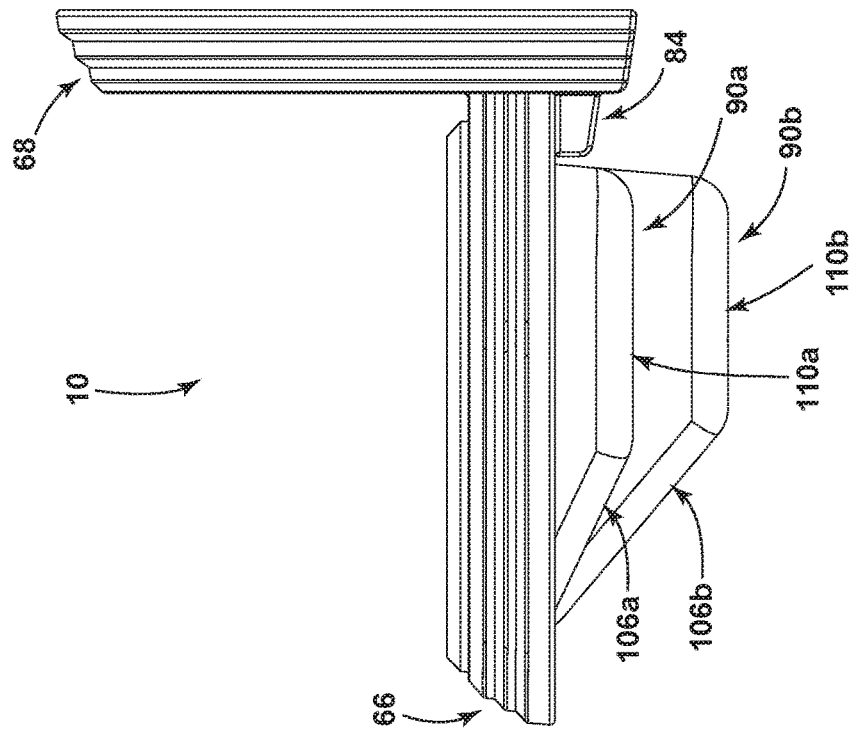
FIG. 21 generally depicts a second side view of an embodiment of a wall mount locking system embodying principles of the present disclosure.
Figure 20:
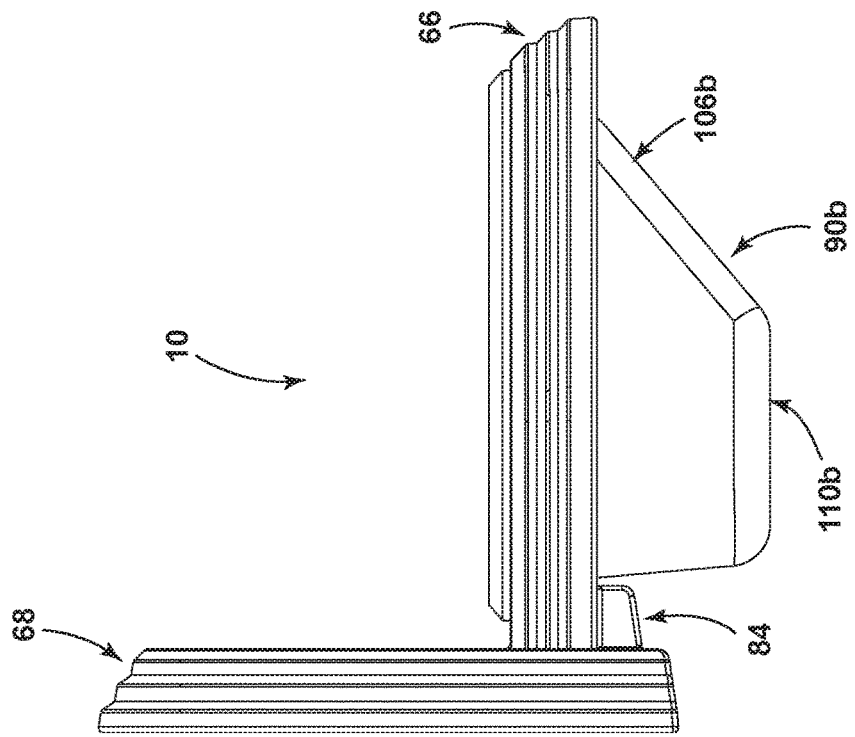
FIG. 20 generally depicts a first side view of an embodiment of a wall mount locking system embodying principles of the present disclosure.

With reference to FIGS. 15-21, another embodiment of a wall mount locking system 10 is generally illustrated. The system 10 may include a wall mount adaptor 12, back splash 68, tray 66, and receptacles 90. The wall mount adaptor 12 may be secured to wall 14. The tray 66 may receive receptacles 90, such as generally shown in FIG. 16. Tray 66 may be received into and engage back splash 68, such as generally shown in FIG. 17. Back splash 68 may engage wall mound adaptor 12, thereby securing the wall mount locking system 10 to wall 14.

Figure 38:
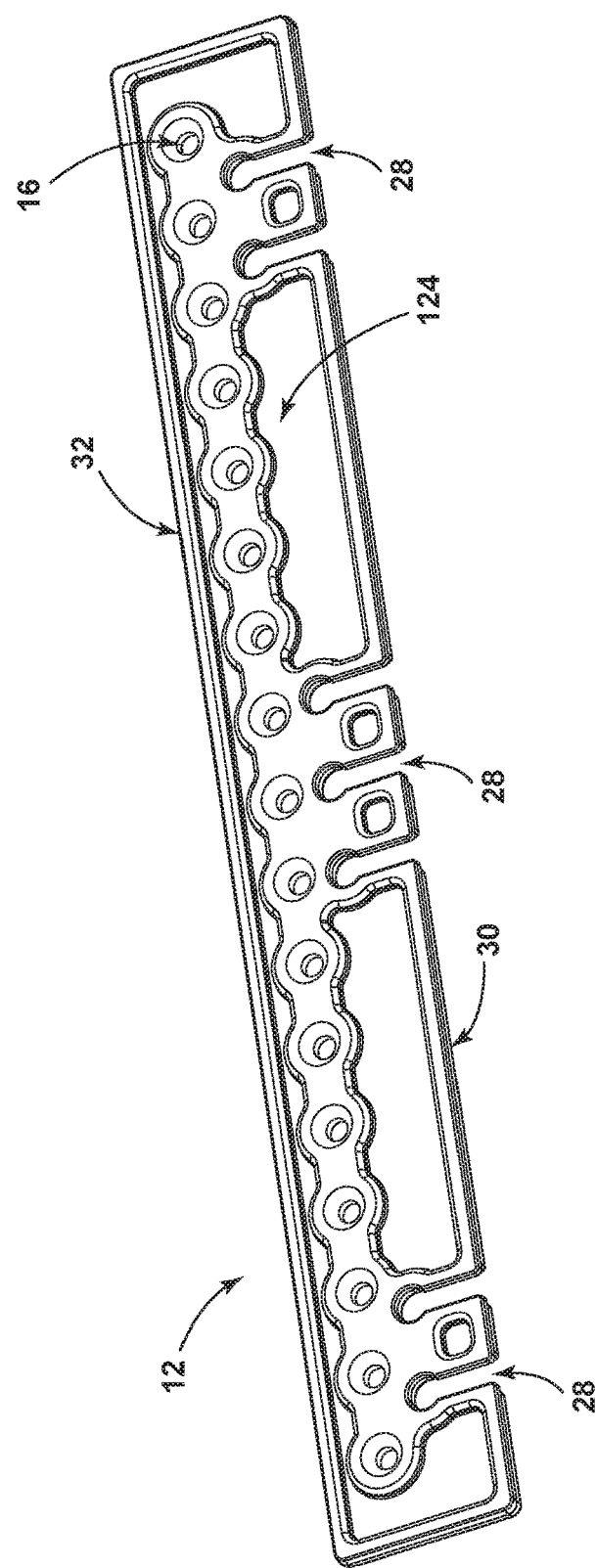
FIG. 38 generally depicts a perspective view of an embodiment of a wall mount adaptor embodying principles of the present disclosure.

The wall mount adaptor 12 may be configured to be secured to a surface, such as wall 14. In embodiments, the wall mount adaptor 12 may include a plurality of apertures or holes 16, such as generally shown in FIGS. 15 and 38. The holes may be round, rectangular, or any suitable shape. Holes 16 may comprise through bores that pass through a front side 18 of the wall mount adaptor 12 through a wall facing side 20 of the wall mount adaptor 12. Wall mount adaptor 12 may include recessed regions 124, e.g., to reduce the wall thickness and weight of wall mount adaptor 12. Embodiments may or may not include wall mount adaptor 12, e.g., excluding it may provide for less complex and/or expensive blow molding.

As generally shown in FIGS. 15, 16, and 19-21, the wall mount locking system 10 may include receptacles 90. Receptacles 90 may include a taper (e.g., at or greater than about 5 or about 7 degrees) and/or serrations to help lock receptacles 90 relative to opening 72 of tray 70. In embodiments, receptacle 90 may be of the same or different sizes and/or shapes, e.g., receptacles 90a, 90b. Receptacle 90a may be dimensioned to receive liquids (e.g., water for a pet) and receptacle 90b may be dimensioned to receive solids (e.g., food for a pet), or vice versa. Moreover, with some embodiments, a plurality of receptacles may receive similar contents (e.g., solids or liquids). As such, receptacle 90a may include a back wall 100a, a side wall 102a, a side wall 104a, a tapered wall 106a, a front wall 108a, and a bottom wall 110a forming a first polygonal or round shape. For example, a polygonal shape may include a rectangular or pentagon shape. As another example, a round shape may include an oval or circular shape. Further, receptacle 90b may include a back wall 100b, a side wall 102b, a side wall 104b, a tapered wall 106b, a front wall 108b, and a bottom wall 110b forming a second polygonal or round shape. Receptacles 90a, 90b may be configured to be received in respective openings 72a, 72b having corresponding back, side, and front surfaces forming polygonal or round shapes.

Figure 24:
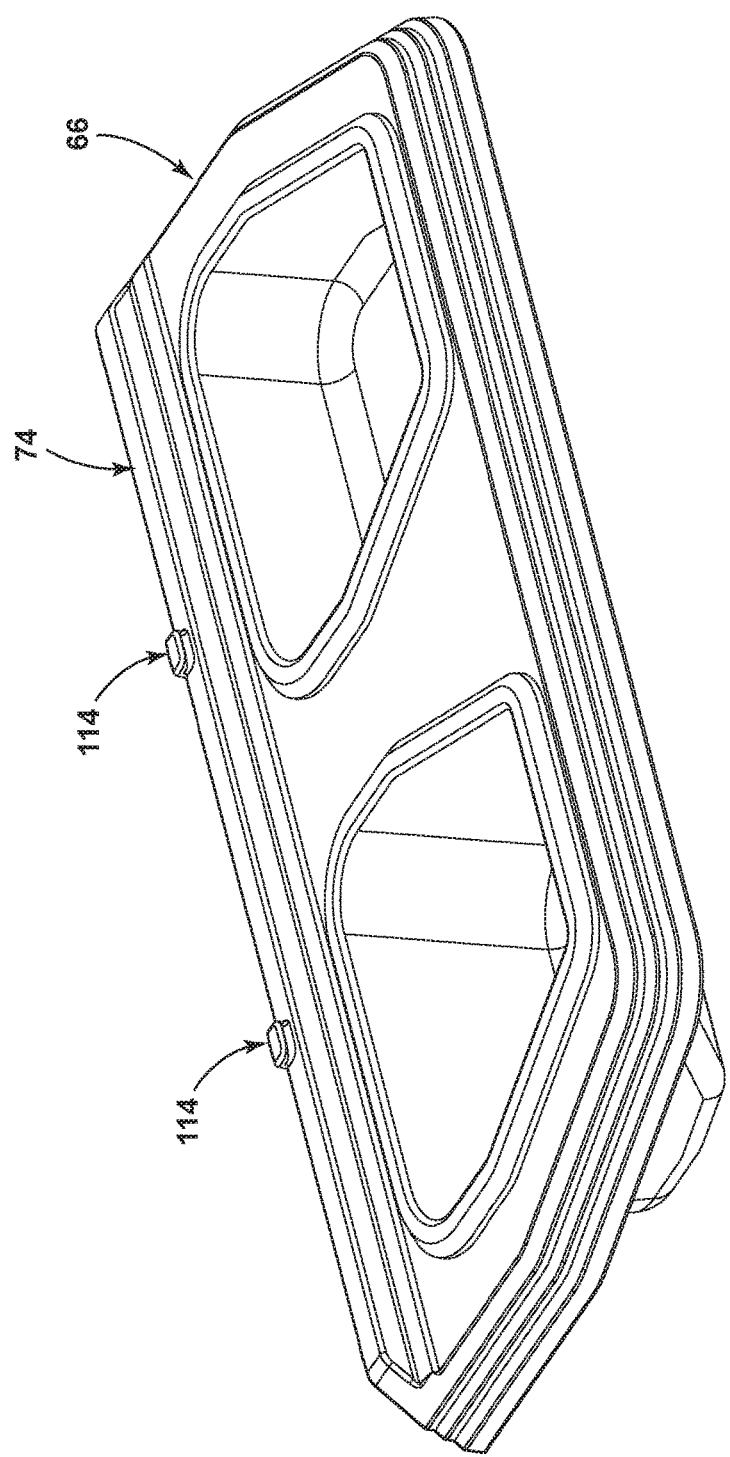
FIG. 24 generally depicts a perspective view of an embodiment of a tray with a plurality of insertable receptacles.
Figure 25:
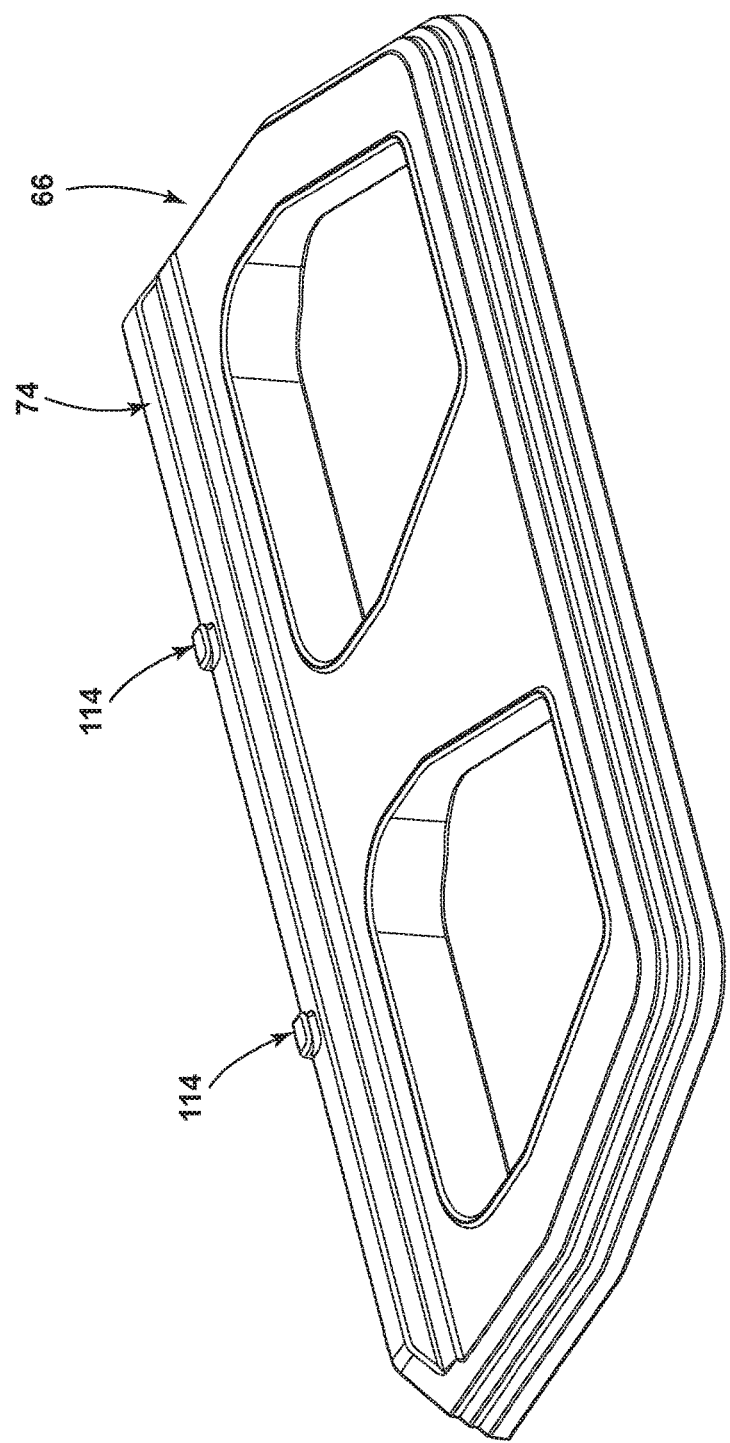
FIG. 25 generally depicts a perspective view of an embodiment of a embodying principles of the present disclosure.
Figure 26:
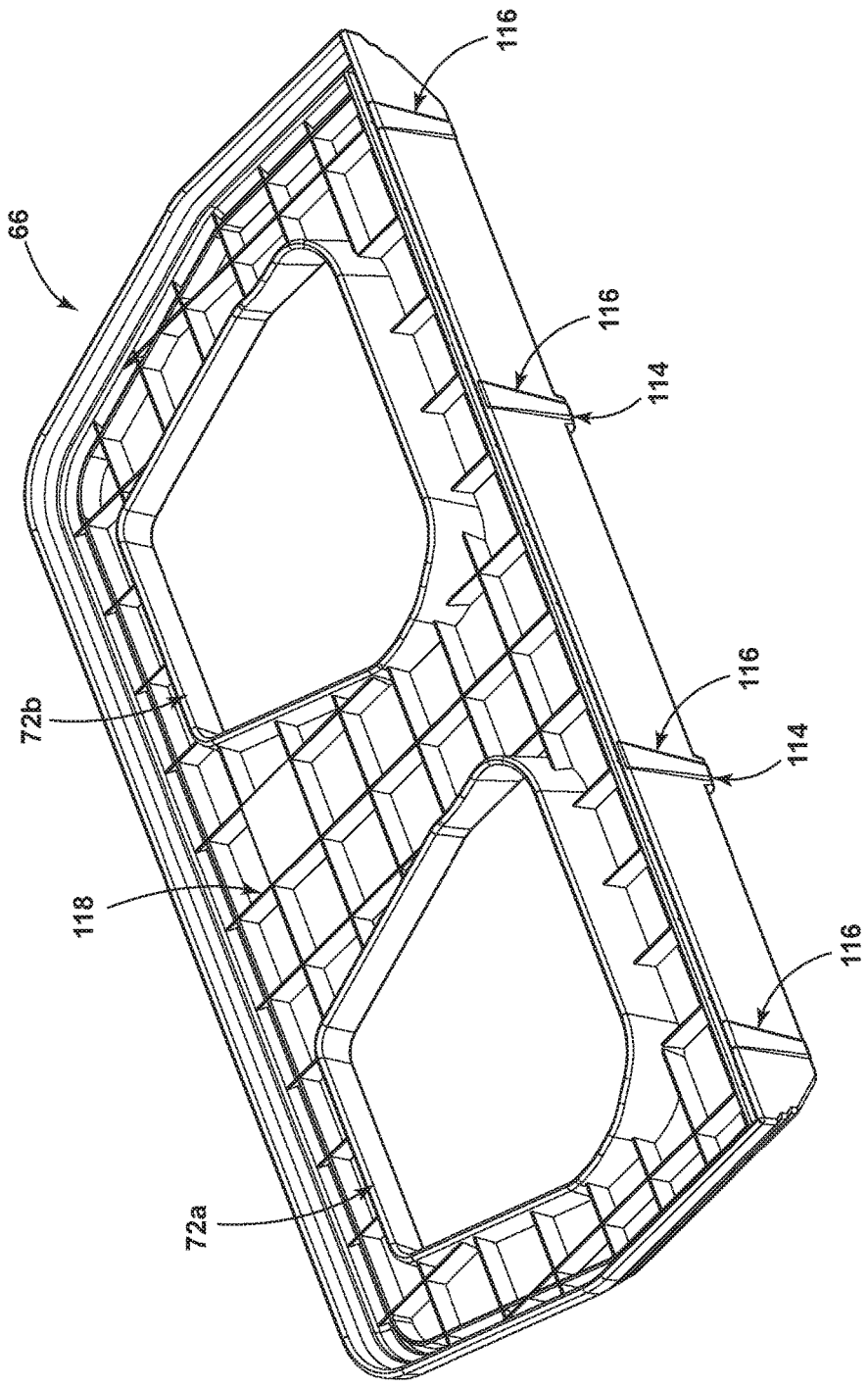
FIG. 26 generally depicts a bottom perspective view of an embodiment of a tray.
Figure 32:
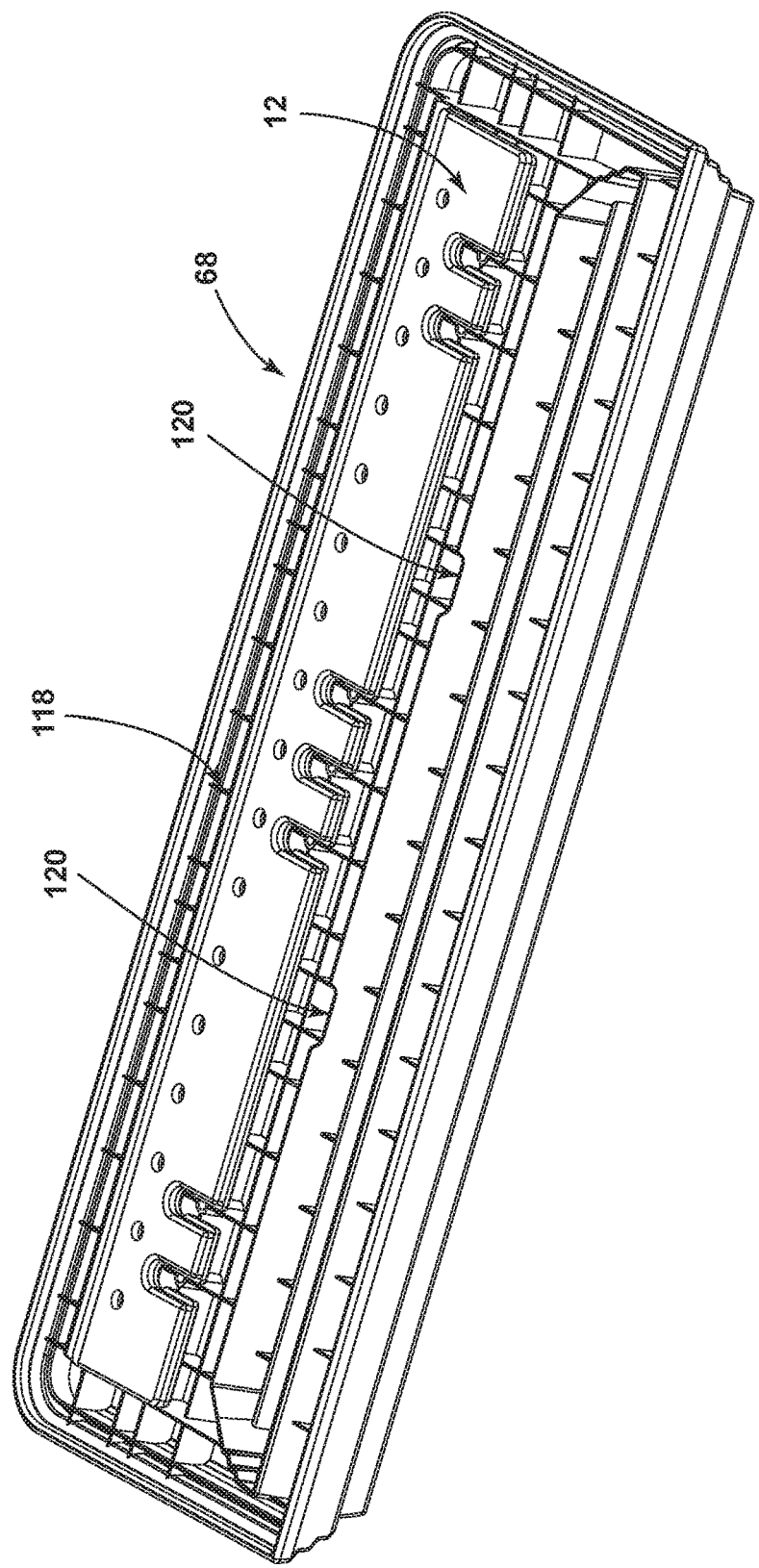
FIG. 32 generally depicts a back perspective view of an embodiment of a back splash and wall mount adaptor embodying principles of the present disclosure.
Figure 35:
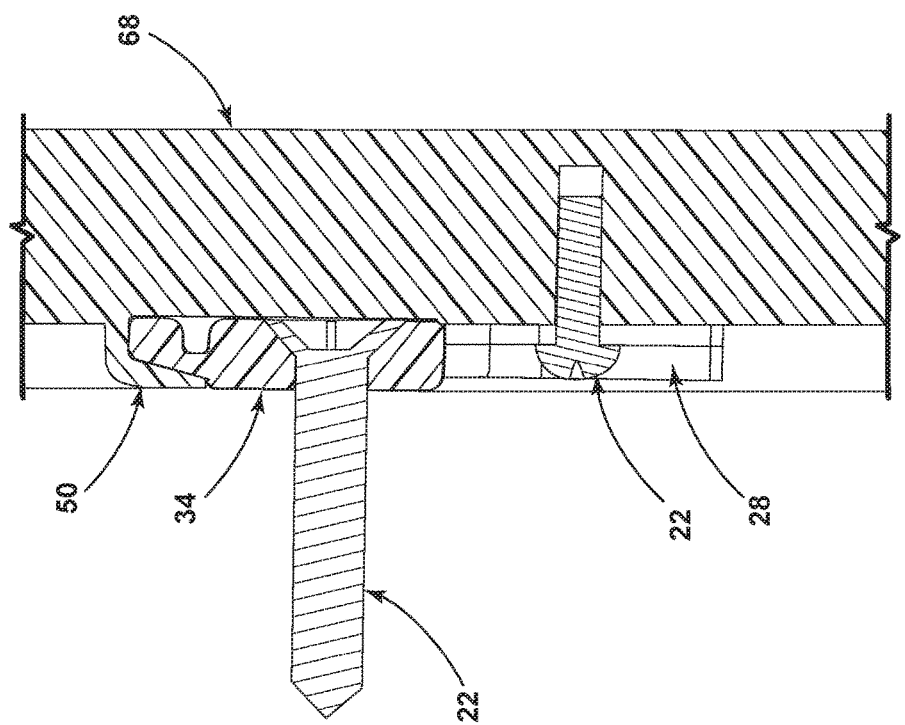
FIG. 35 generally depicts a closer cross-section view of an embodiment of a wall mount and back splash of the present disclosure, e.g., after being attached to a wall.
Figure 36:
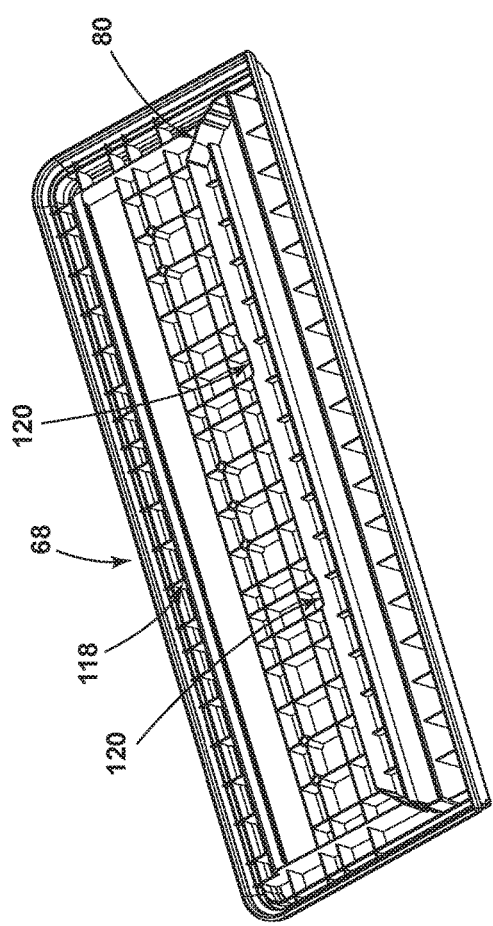
FIG. 36 generally depicts another back perspective view of an embodiment of a back splash embodying principles of the present disclosure.
Figure 37:
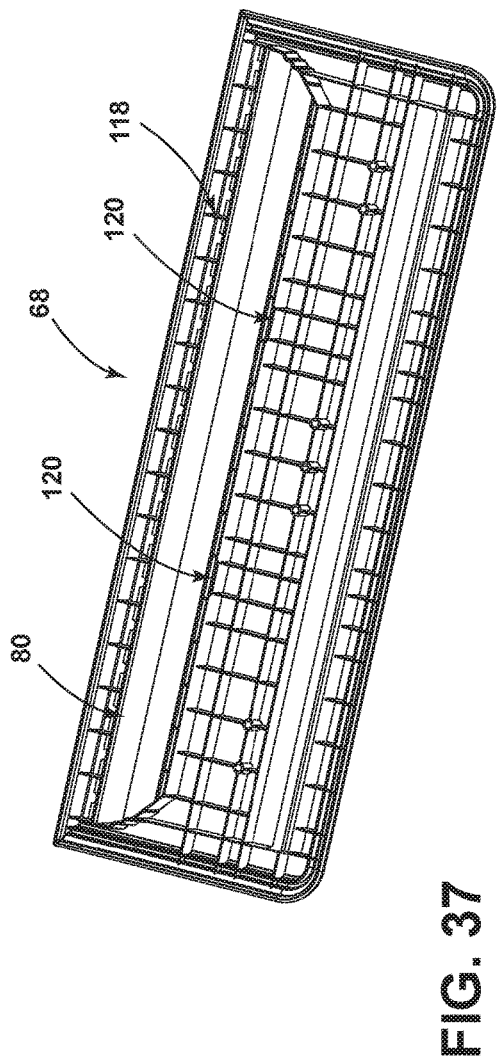
FIG. 37 generally depicts another back perspective view of an embodiment of a back splash embodying principles of the present disclosure.

The wall mount locking system 10 may include features to increase stability, such as generally shown in FIGS. 17 and 24-37. Tray 70 may include one or more protrusions or clips 114, e.g., extending from stop 72 of tray 70, such as generally shown in FIGS. 24-25. Protrusions 114 may reduce or prevent separation from occurring, e.g., due to heavier loads on tray 70. Back splash slot 80 may include one or more recesses 120, such as generally shown in FIGS. 32 and 35-36. The recesses 120 may be configured to receive the one or more protrusions 114. Further, rear portion 76 of tray 70 may include a rib 116, e.g., providing structural support for rear portion 76 and the one or more protrusions 114. As discussed above, back splash 68 may also include a tray support 84, such as generally shown in FIGS. 29-30.

As generally shown in FIGS. 17 and 33-35, back splash 68 may include all or any portion of hook adaptor 42, e.g., engagement portion 50. In embodiments, hook adaptor 42 may be part of back splash 68, e.g., integral to or formed as one piece with back splash 68. As generally shown in FIG. 17, fasteners 22 may be slideably received in respective slots 28. Fasteners 22 may be positioned through wall mount adaptor 12 and into back splash 68, e.g., prior to being mounted to wall 14. Fasteners 22 may be configured to resist or prevent the wall mount locking system 10 from being unintentionally removed or knocked off the wall, e.g., by an upward force or contact with a bottom of tray 68.

Referring again to FIGS. 33-35, engagement portion 50 may extend downwardly from back splash 68. Engagement portion 50 may be configured to slideably receive mating adaptor 42 and secure mating adaptor 42 thereto. Engagement portion 50 may engage recess 34 of mating adaptor 42. Thus, engagement portion 50 of back splash 68 may secure the wall mount locking system 10 relative to hook adaptor 42, e.g., without a separate hook adaptor 42.

Figure 22:
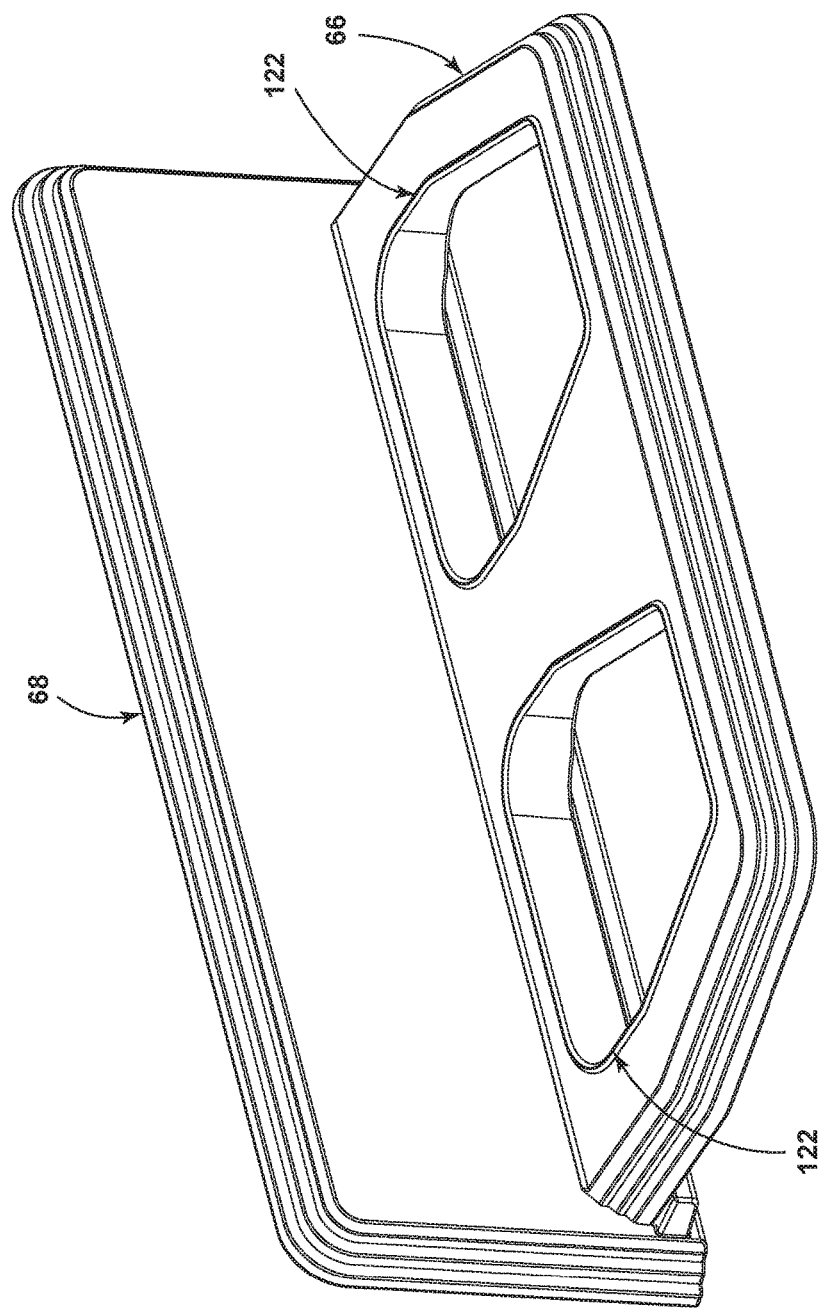
FIG. 22 generally depicts a perspective view of an embodiment of a tray and back splash assembly embodying principles of the present disclosure.
Figure 23:
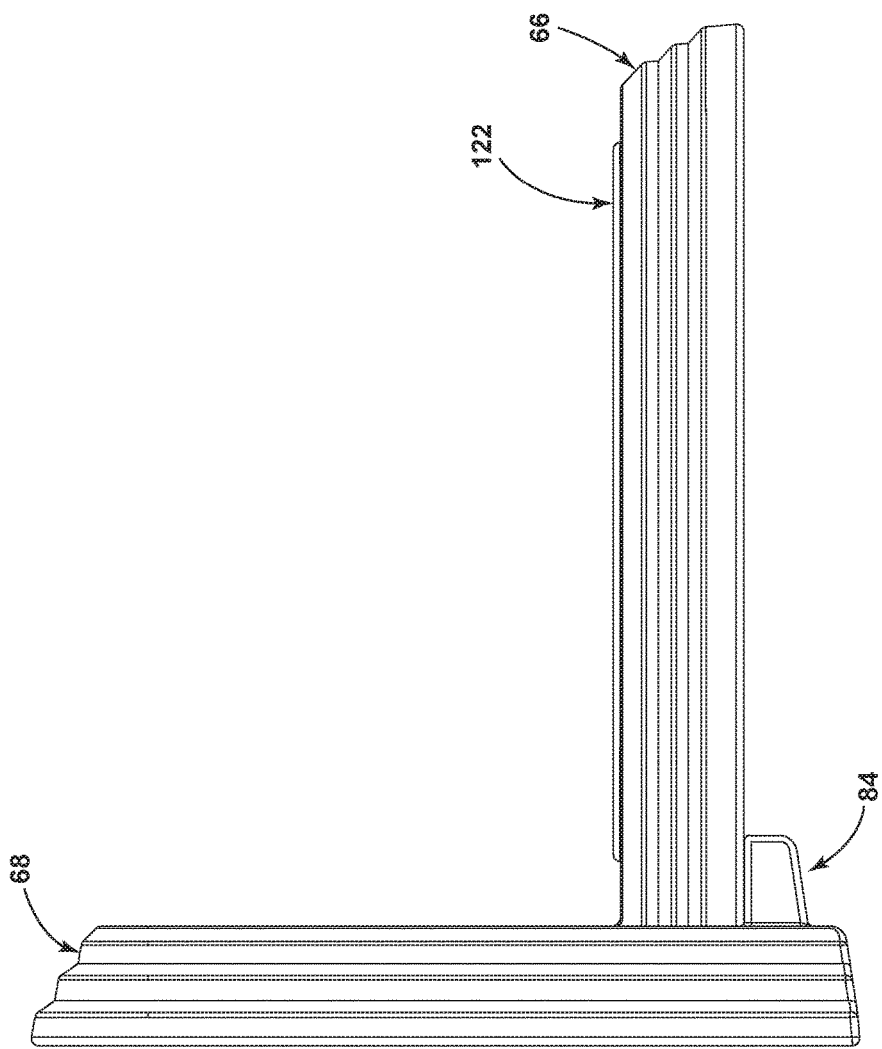
FIG. 23 generally depicts a side view of an embodiment of a tray and back splash assembly embodying principles of the present disclosure.

Tray 68 may include one or more lips 122. Lip 122 may be the same as or different than lip 92. As generally shown in FIGS. 22, 23, and 25, lip 122 may be raised or protrude upwardly from tray 68, e.g., to engage or elevate receptacle 90. Alternatively or in addition, lip 122 may project inwardly from opening 72, e.g., to provide a friction fit with receptacle 90. Lip 122 may enhance relative position and fit between tray 68 and receptacle 90. In embodiments, receptacle 90 may include a formation such as a protrusion or channel to engage lip 122. Lip 122 may help prevent food and/or water from getting between tray 68 and receptacle 90. In addition, lip 122 may help prevent receptacle 90 from sticking in opening 72.

Referring to FIGS. 24-29, another embodiment of tray 66 is illustrated. Tray 66 may include features to increase the stability and/or usability of the system. As generally shown in FIGS. 22-23, tray 66 and/or back splash 68 may include corrugated or contoured edges, e.g., to provide strength and/or improved appearance. As generally shown in FIGS. 24-25, tray 66 may include stop 74, as discussed above. Stop 74 may include a taper on its ends, e.g., to seal with the back splash 68 so as to prevent water from dripping therefrom. Stop 74 may be configured to engage an corresponding taper on back splash 68. Stop 74 may also include one or more protrusions 114 that extend upwardly from stop 74. Protrusions 114 may be configured to engage back splash 68, as discussed above.

As generally shown in FIGS. 17, 26, 29, and 35-37, tray 66 and back splash 68 may include lattice structure 118. Lattice structure 118 may include a rib pattern and sizing to provide increased structural integrity, improved quality, easier tool design, and/or better appearance. Lattice structure 118 may include a rectangular or otherwise polygonal arrangement of structural walls. Lattice structure 118 may, for example, reduce the weight and increase the rigidity of tray 66 and back splash 68.

Figure 27:
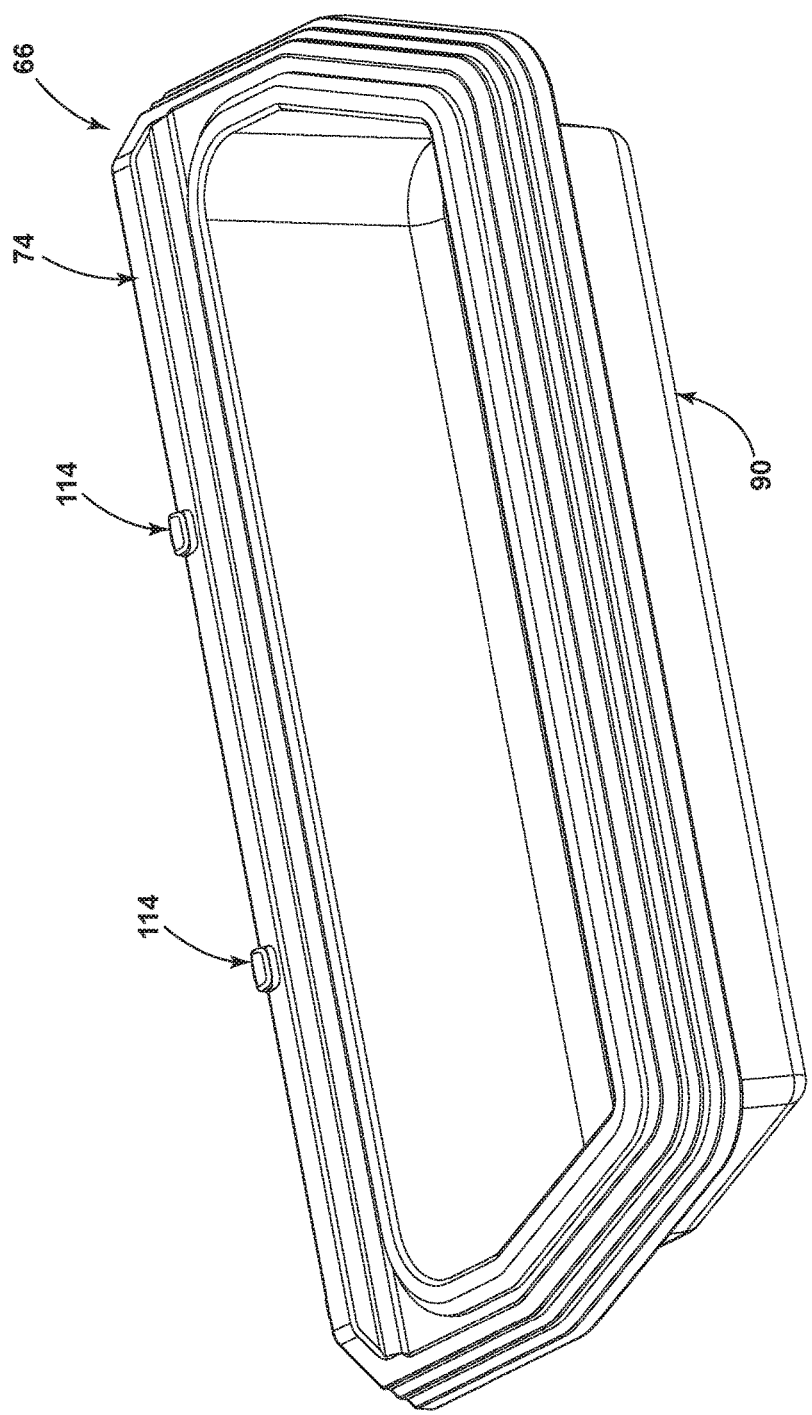
FIG. 27 generally depicts a perspective view of an embodiment of a tray with an insertable receptacle.
Figure 28:
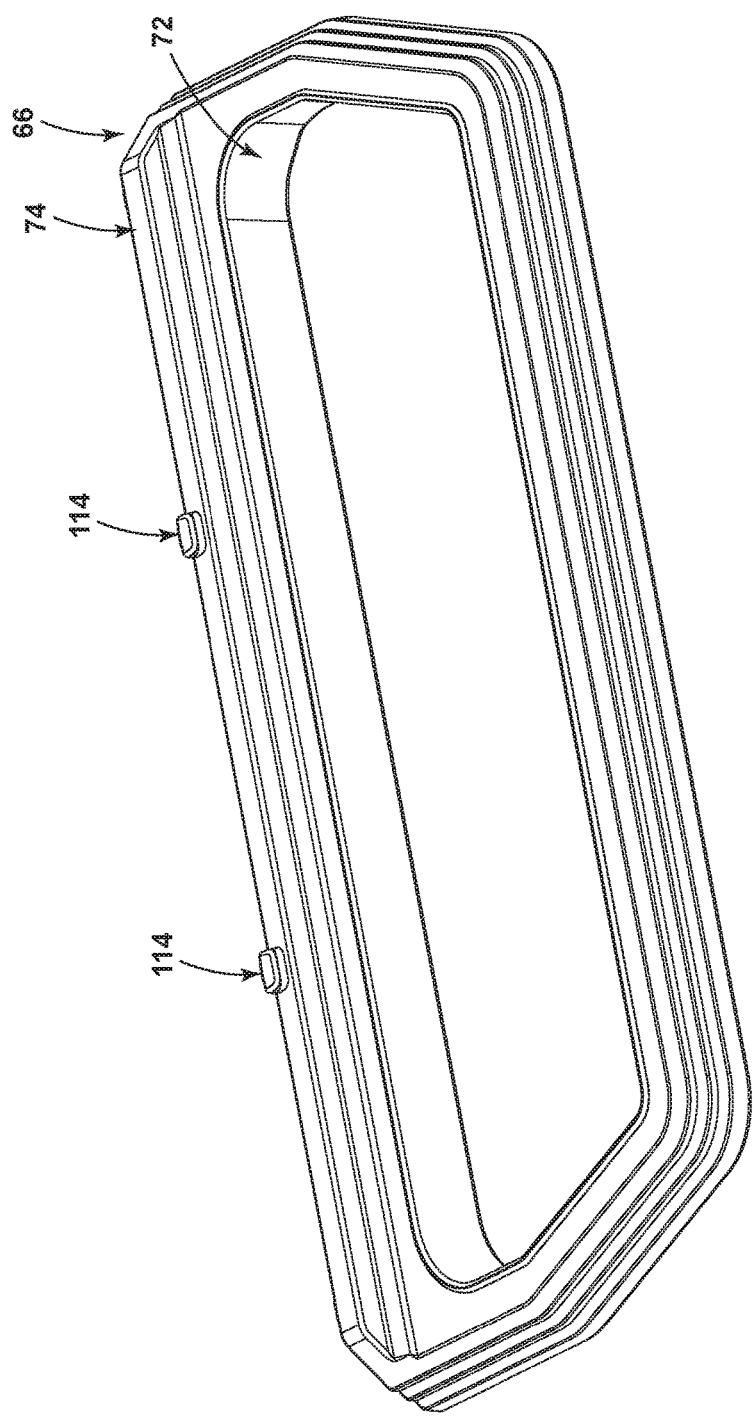
FIG. 28 generally depicts a perspective view of an embodiment of a tray embodying principles of the present disclosure.
Figure 29:
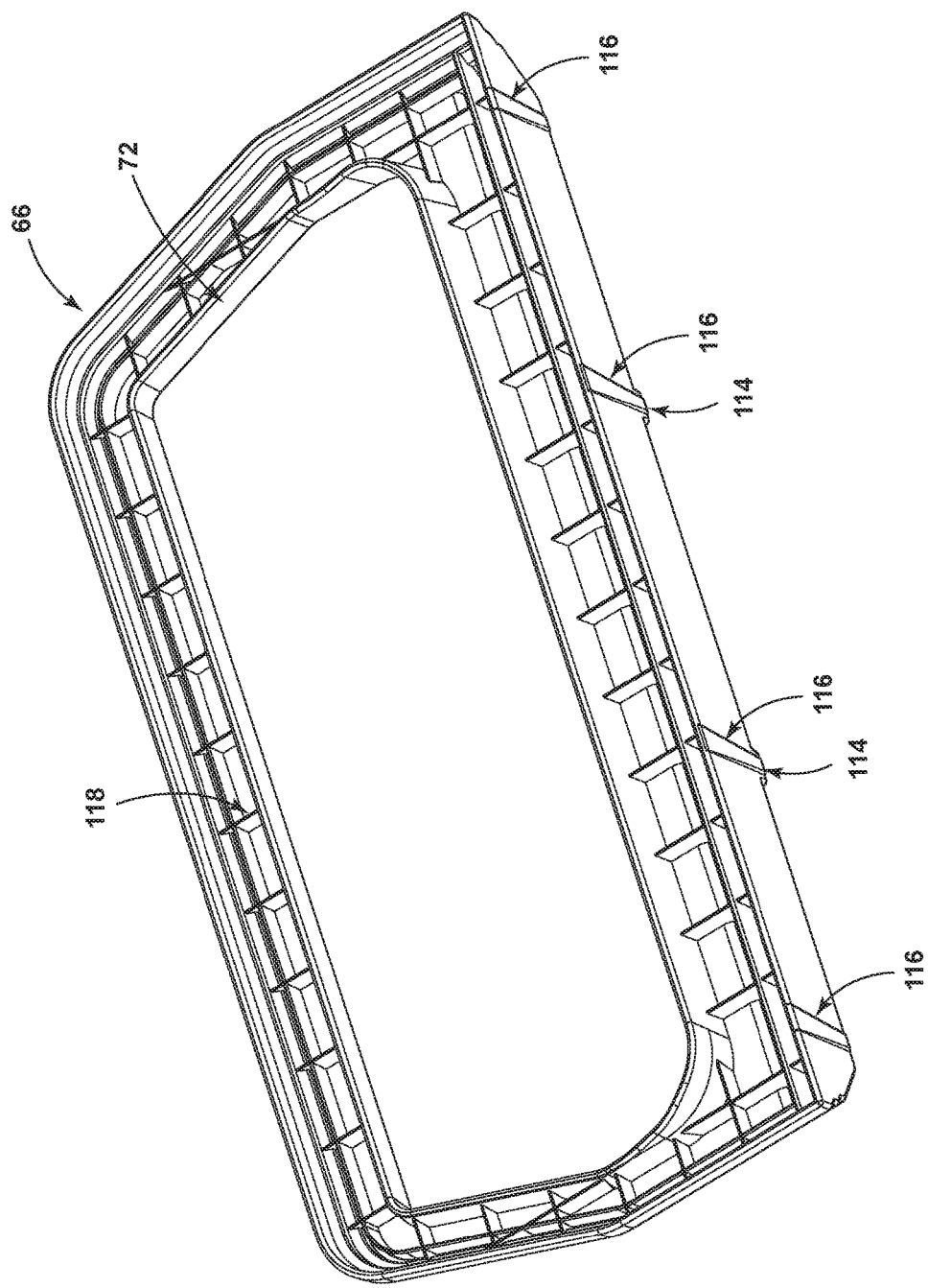
FIG. 29 generally depicts a bottom perspective view of an embodiment of a tray embodying principles of the present disclosure.

Wall mount locking system 10 may be configured for a unitary receptacle 90, such as generally shown in FIGS. 27-29. Unitary receptacle 90 may be received in a single opening 72 of tray 66. Unitary receptacle 90 may span substantially an entire width and depth of tray 66, without sharing space with another receptacle 90. Thus, unitary receptacle 90 may be configured to hold an increased volume of water or food.

Methods are also contemplated. An exemplary method may comprise providing a wall mount adaptor with a recess, a tray with a stop and at least one receptacle opening, and a back splash with a tray opening and a protrusion. A method may further comprise mounting a wall mount adaptor to a wall and the wall mount adaptor having a recess. A method may further include engaging a tray with a back splash though an opening in a back splash and engaging a protrusion of the backsplash with the recess of the wall mount adaptor. In addition, a method may include performing at least one of the engaging the tray and the engaging the protrusion without separate tools, e.g., by hand or manually.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements, relative movement between elements, physical connections (e.g., fluid connections), and/or electrical connections (wired and/or wireless). As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed is:

1. A system for mounting a tray to a wall, the system comprising:
    a wall mount adaptor configured to be secured to said wall, the wall mount adaptor including a top recessed portion disposed proximate said wall and a plurality of slots disposed on a side of the wall mount adaptor opposite said wall;
    a back splash having a wall facing side and a tray opening including a horizontal slot with a slot recess that extends into the wall facing side, the back splash configured to be secured to the wall mount adaptor;
    a tray having a tray top, a tray bottom, a rear portion, a stop, and a receptacle opening, the tray being configured to be received from the wall facing side of the back splash through the horizontal slot such that at least a portion of the tray is fixed between said wall and the back splash to resist the tray from passing entirely through the horizontal slot and retain the tray in an extended position,
    wherein the stop includes a horizontal formation that extends from the tray top and along the rear portion of the tray, and the horizontally extending formation of the stop is configured to be received in the slot recess of the horizontal slot,
    wherein the receptacle opening extends between the tray top and the tray bottom, and the receptacle opening is configured to receive at least a portion of a receptacle therethrough
    wherein the horizontal slot includes an upper surface and the slot recess is formed into the upper surface, and
    wherein the tray includes opposing sidewalls and the stop does not extend beyond the opposing sidewalls.

2. The system of claim 1, further comprising:
    a mating adaptor including:
    a protrusion that extends along a wall facing side of the mating adaptor, the protrusion being configured to engage or connect with the wall mount adaptor; and
    a plurality of connectors or pins extending from the wall facing side of the mating adaptor, each of the plurality of connectors or pins being configured to engage or connect with a respective one of the plurality of slots of the wall mount adaptor,
    wherein the mating adaptor is part of the back splash.

3. The system of claim 1, wherein the receptacle opening includes at least one of a round shape and a polygonal shape.

4. The system of claim 1, wherein the tray includes first and second receptacle openings of different sizes, shapes, or sizes and shapes, and
    wherein the tray is configured to conformingly engage the horizontal slot of the back splash.

5. The system of claim 1, wherein the receptacle includes a tapered wall.

6. The system of claim 1, wherein the receptacle includes a unitary receptacle configured to be received in the receptacle opening including a single receptacle opening of the tray.

7. The system of claim 1, wherein the receptacle includes a plurality of receptacles.

8. The system of claim 1, wherein the tray includes a lip.

9. The system of claim 8, wherein the lip upwardly extends from the tray and is configured to engage the receptacle.

10. The system of claim 8, wherein the receptacle includes a plurality of ridges and a formation configured to engage the lip of the tray.

11. A system comprising:
a wall mount adaptor having a wall facing side with a recess; wherein the wall facing side is configured to engage a wall;
a back splash having a wall facing side and a tray opening including a horizontal slot with a slot recess that extends into the wall facing side: and
a tray having a tray top, a tray bottom, a rear portion, and a stop,
the stop being configured such that at least a portion of the tray is fixed between the wall and the back splash to retain the tray in an extended position, the tray having at least one receptacle opening, the tray being configured to be positioned substantially horizontal relative to the wall;
wherein the back splash is configured to receive at least a portion of the tray from the wall facing side of the back splash and to engage the stop, and the back splash has a protrusion configured to engage the recess of the wall mount adaptor,
wherein the stop includes a horizontal formation that extends from the tray top and along the rear portion of the tray, and the horizontally extending formation of the stop is configured to be received in the slot recess of the horizontal slot
wherein the at least one receptacle opening extends between the tray top and the tray bottom, and the at least one receptacle opening is configured to receive at least a portion of a receptacle therethrough,
wherein the horizontal slot includes an upper surface and the slot recess is formed into the upper surface, and
wherein the tray includes opposing sidewalls and the stop does not extend beyond the opposing sidewalls.

12. The system of claim 11, including a mating adaptor that is part of the back splash.

13. The system of claim 11, wherein the at least one receptacle opening includes at least one of a round shape and a polygonal shape.

14. The system of claim 11, wherein the tray includes first and second receptacle openings of different sizes, shapes, or sizes and shapes, and
wherein the tray is configured to conformingly engage the horizontal slot of the back splash.

15. The system of claim 11, wherein the receptacle includes a tapered wall.

16. The system of claim 11, wherein the receptacle includes a unitary receptacle configured to be received in the at least one receptacle opening including a single receptacle opening.

17. A method comprising:
providing a wall mount adaptor with a recess, a tray with a tray top, a tray bottom, a rear portion, a stop and at least one receptacle opening; and a back splash with a tray opening and a protrusion, wherein the tray includes a tray bottom, the at least one receptacle opening extends between the tray top and the tray bottom, and the at least one receptacle opening is configured to receive at least a portion of a receptacle therethrough, and wherein the tray includes opposing sidewalls and the stop does not extend beyond the opposing sidewalls:
mounting the wall mount adaptor to a wall, the wall mount adaptor having the recess; engaging the tray from a wall facing side of the back splash through the tray opening including a horizontal slot with a slot recess in the back splash such that at least a portion of the tray is fixed between the wall and the back splash to retain the tray in an extended position, wherein the stop includes a horizontal formation that is configured to be received in the slot recess of the horizontal slot and the horizontal slot includes an upper surface and the slot recess is formed into the upper surface; and
engaging a protrusion of the back splash with the recess of the wall mount adaptor.

18. The method of claim 17, wherein at least one of the engaging the tray and the engaging the protrusion is performed without separate tools.

* * * * *